(12) United States Patent
Hawkins

(10) Patent No.: US 12,396,467 B2
(45) Date of Patent: Aug. 26, 2025

(54) HERBAL INFUSION AND DECARBOXYLATION DEVICE

(71) Applicant: Jeffrey Hawkins, Liberty, MO (US)

(72) Inventor: Jeffrey Hawkins, Liberty, MO (US)

( * ) Notice: Subject to any disclaimer, the term of this patent is extended or adjusted under 35 U.S.C. 154(b) by 544 days.

(21) Appl. No.: 17/934,919

(22) Filed: Sep. 23, 2022

(65) Prior Publication Data

US 2023/0018674 A1    Jan. 19, 2023

Related U.S. Application Data

(63) Continuation-in-part of application No. 29/825,929, filed on Feb. 7, 2022, now Pat. No. Des. 980,003, (Continued)

(51) Int. Cl.
| | |
|---|---|
| *A23F 3/00* | (2025.01) |
| *A23F 3/18* | (2006.01) |
| *A23F 3/20* | (2006.01) |
| *A47J 31/06* | (2006.01) |
| *A47J 31/56* | (2006.01) |

(52) U.S. Cl.
CPC ............ *A23F 3/18* (2013.01); *A23F 3/20* (2013.01); *A47J 31/06* (2013.01); *A47J 31/56* (2013.01)

(58) Field of Classification Search
CPC ... A23F 3/18; A23F 3/20; A47J 43/046; A47J 31/06
See application file for complete search history.

(56) References Cited

U.S. PATENT DOCUMENTS

| 4,226,175 A | 10/1980 | Sandor |
| 10,039,413 B1 | 8/2018 | Bellman et al. |
| (Continued) | | |

FOREIGN PATENT DOCUMENTS

| CN | 105686666 A | 6/2016 |
| EP | 2218375 A2 | 8/2010 |

OTHER PUBLICATIONS

Ninja, Ninja HB152 Foodi Heat-iQ Blender, 64 oz, Black, retrieved from internet, retrieved on Sep. 22, 2022; <URL: https://www.amazon.com/Ninja-Blender-Smoothies-Nonstick-HB152/dp/B07S65293D>.

(Continued)

*Primary Examiner* — Anshu Bhatia

(57) ABSTRACT

An herbal infusion and decarboxylation device is an apparatus that enables higher control over an infusion process to make a high-quality infused product. The apparatus includes an infusion chamber and an infusion mechanism. The infusion chamber enables the monitoring and measuring of the infusion materials by including a chamber body, a chamber handle, and a lid assembly. The chamber body retains the infusion materials. The lid assembly includes several attachments to facilitate the infusion of the infusion materials. The chamber handle facilitates the safe handling of the chamber body. The infusion mechanism includes a motor, a blade assembly, a heating plate, and a temperature sensor. The motor drives the blade assembly to enable the infusion process. The heating plate enables the controlled heating of the infusion materials in the chamber body. The temperature sensor helps monitor the temperature of the infusion materials to adjust the operation of the heating plate.

17 Claims, 18 Drawing Sheets

Related U.S. Application Data which is a continuation-in-part of application No. 29/724,484, filed on Feb. 14, 2020, now Pat. No. Des. 974,101, application No. 17/934,919 is a continuation-in-part of application No. 29/724,484, filed on Feb. 14, 2020, now Pat. No. Des. 974,101.

(60) Provisional application No. 63/250,091, filed on Sep. 29, 2021.

(56) References Cited

U.S. PATENT DOCUMENTS

| | | | |
|---|---|---|---|
| D882,338 S | 4/2020 | Bellman | |
| 10,758,078 B2 | 9/2020 | Bellman et al. | |
| 2005/0057876 A1 | 3/2005 | Kim | |
| 2016/0345779 A1* | 12/2016 | Tu | A47J 43/0727 |
| 2021/0022557 A1* | 1/2021 | Atinaja | A23L 21/10 |

OTHER PUBLICATIONS

Active Gear Guy, Electric Infuser, retrieved from internet, retrieved on Sep. 22, 2022; <URL: https://activegearguy.com/products/active-gear-guy-infuser-machine-for-butters-oils-tinctures-chocolate-and-gummies-decarb-feature-included-comes-with-silicon-mold-and-instruction-recipe-manual>.

Magical, MB2e MagicalButter Machine, retrieved from internet, retrieved on Sep. 22, 2022; <URL: https://magicalbutter.com/products/magicalbutter?variant=36113060331676&currency=USD&utm_medium=product_sync&utm_source=google&utm_content=sag_organic&utm_campaign=sag_organic>.

Levo, Levo C—Large Batch Herbal Oil Infusion Machine—Botanical Extractor—Herb Decarboxylator & Oil Infuser—Edible Infusion Maker—For Infused Gummies, Tinctures, Brownies & More—Butter Yellow, retrieved from internet, retrieved on Sep. 22, 2022; <URL: https://www.amazon.com/LEVO-Botanical-Extractor-Decarboxylator-Tinctures/dp/B0B3Y5Z8JZ/ref=sr_1_1_sspa?keywords=Mighty+Fast+Herbal+Infuser&qid=1663886325&sr=8-1-spons&psc=1>.

Roman Ventures, Infusion Buds Butter Infuser Machine- 2021 Herbal Butter Maker Machine | Herbal Butter & Oil Infuser Machine. Butter Machine | Includes Decarb Box And Tons Of Accessories, retrieved from internet, retrieved on Sep. 22, 2022; <URL: https://tinyurl.com/2kmv5v3h>.

Ivahim, Ivation Herbal Infusion Machine, Botanical Extractor Infuser for making Butter, Oils, Tinctures & More, Makes 1-4 cups (2 to 8 sticks) of Butter, 2 Filters, Butter Tray, Mitt, 55 Page Recipe Book, retrieved from internet, retrieved on Sep. 22, 2022; <URL: https://tinyurl.com/2p9btph5>.

Pulsar Enjoy Higher Culture, Pulsar Herbal Chef Electric Butter Infuser, retrieved from internet, retrieved on Sep. 22, 2022; <URL: https://www.pulsarvaporizers.com/collections/herbal-chef/products/herbal-chef-electric-herbal-infuser>.

STX International, STX Infuzium 420 Butter-Oil-Tincture Infuser Maker Machine Bonus Pack • 2 to 10 Sticks Butter • 4 Filters, 3 Spatulas, Silicone Glove, Butter Mold, 2 Gummy Molds Plus our Infuzium 48 Page Cookbook, retrieved from internet, retrieved on Sep. 22, 2022; <URL: https://tinyurl.com/24essbxn>.

* cited by examiner

HERBAL INFUSION AND DECARBOXYLATION DEVICE

The current application is a continuation-in-part (CIP) application of the U.S. design application Ser. No. 29/825, 929 filed on Feb. 7, 2022. The U.S. design application 29/825,929 is a CIP application of the U.S. design application Ser. No. 29/724,484 filed on Feb. 14, 2020.

The current application also claims a priority to a U.S. provisional application Ser. No. 63/250,091 filed on Sep. 29, 2021.

FIELD OF THE INVENTION

The present invention relates generally to herbal infusion methods and mechanisms. More specifically, the present invention is a novel herbal infusion and decarboxylation device that provides the user with manual and automatic means to control the herbal infusion process more efficiently and accurately.

BACKGROUND OF THE INVENTION

Herbal infusion into butters and oils derived from plants and animals can be a complicated process that requires the use of different tools to achieve the desired infusion level on the target product. To avoid the possible complications, many individuals use infusion devices (infusers) to infuse different herbs and seasonings into different products including, but not limited to, butters, oils, and materials used to create infused tinctures. Most traditional infusers are designed to perform the infusion process with predetermined time and temperature settings set at the manufacturing facility or come with specific instructions on the herbal to oil/butter ratios for the infusion process. Further, many infusers lack the means to accommodate the wide range of variables or conditions the different infusion materials require for the most efficient herbal infusion. For example, the amount of heat, time, and emulsion rates needed to correctly infuse the infusion materials vary based on the amounts and type of infusion materials used.

Most traditional infusers also instruct users to abide by the manufacturers set herbal to oil ratios outlined in the user's manuals. When the user wants to infuse different ratios outside of what is recommended in the user's manual, the user is required to check on the state of the infusion materials within the infuser periodically during the infusion process. If the user does not have the ability to visually determine the condition of the infused materials or the infuser does not allow for visual inspection of the infusion materials with liquid measuring marks, then the user cannot efficiently control, measure, or monitor the infusion process based on the physical appearance of the infused materials. For example, making infused alcohol tinctures in previous infusers can be hard as the alcohol evaporates and reduces the liquid levels within the infuser. When the alcohol level lowers from evaporation it causes the tincture to become more concentrated and the user needs the ability to visually measure and inspect this process to ensure the correct thickness of the tincture is achieved.

Furthermore, many traditional infusers are also designed with a motor located on the lid of the infuser. This design prevents the user from checking on the state of the infused materials within the infusion chamber during the infusion and decarboxylation process as removing the lid requires the motor to be turned off. This can result in the timer being reset and the infuser having to be reheated. Additionally, the lid/motor design can be inconvenient for use as once the lid is removed, the blades of the motor can make it difficult for the lid to be safely placed on a flat surface. Further, if the infuser has just been used, the user can make a mess due to the blades being covered with the infusion materials. Setting down the lid/motor on a surface during inspection can also potentially contaminate the infusion materials within the infuser of unwanted substances. In addition, traditional infusers do not incorporate the blade within the bottom portions of the infusion chamber, which can result in heavy herbal materials to become stagnated due to gravity and the lack of pulling/pushing force of the top suspended blade. Extremely heavy or super-thick herbal materials can potentially become stuck on the outer bottom edges of the heating element while the less heavy oils or butters recycle in the top portions near the blade.

Furthermore, other previous infuser designs feature a slow-spinning magnetic mixer in the bottom of the chamber and instructs users to utilize a pod within the chamber to separate the herbs from the mixer. This design creates infusions that are less green and reduces the herbal taste within the infusion; however, it also restricts the user's ability to make infusions with heavy green textures featuring strong herbal tastes similar to the function of the previously described traditional infusers. Many infusion enthusiasts want more control over the infusion process to allow a wider range of infusion capabilities. For example, some enthusiast like less herbal taste with low green appearance while some prefer the thicker green consistency with heavier herbal taste. Further, there are many types of foods that can be created with the infused oils and butters. The type of food the user is preparing would also be a factor on the level of herbal taste needed to be achieved. Some food tastes can complement the heavy herbal taste and create great tasting infused meals, while other foods would almost require clean appearing butters or oils with very low herbal tastes. These previous designs do not integrate a detachable translucent chamber that contains at least one heating element, at least one temperature control sensor, and a blade combination within the bottom inside portion of the chamber. This can cause and or increase potential problems associated with infusions including, but not limited to, inefficient heating due to poor heat exchange, inaccurate temperature readings due to the poor heat exchange, or mixers not capable of thoroughly mixing and blending herbal materials.

Other devices known to infuse herbal materials such as hot/cold blenders are designed to preform to many tasks and incorporate features not commonly used for infusing butters or oils such as blades designed to crush ice. Most hot/cold food blenders heat the chambers contents based solely on predetermined time and temperature settings. Infusing mixtures that contain different herbal to material ratios require different time and temperature settings. However, no current hot/cold food blender can provide the means necessary for the proper decarboxylation of herbal materials and or the infusion of herbal materials into butters and oils by allowing for greater control over the infusion and decarboxylation process by the user.

Therefore, an objective of the present invention is to provide an herbal infusion and decarboxylation device that facilitates the infusion and decarboxylation of different herbal materials into butters and oils by improving the control and over all abilities the user has over the variables of the decarboxylation and infusion process. The present invention enables the user to control the emulsion rates, the temperature and times of the infusion and decarboxylation process as well as the ability to adjust the factory preset times and temperatures of all the manufacture preset functions. This ensures that the infusion and decarboxylation process is properly performed and that the infusion materials are properly decarboxylated and infused to the user's requirements. Another objective of the present invention is to provide an herbal infusion and decarboxylation device that enables the user to properly monitor the infusion process with the use of a transparent chamber marked with liquid measuring marks. The present invention enables users to visually monitor the infused materials within the chamber to ensure no over exposure to heat is occurring while simultaneously allowing for the exact herbal to infusion material ratios to be measured while evaporation or reduction of the liquid material is occurring. Further, the present invention allows for the user to adjust the times and temperatures of the infusion materials based on the visual inspection of materials and liquid measurement marks.

Another objective of the present invention is to provide users with a uniquely arranged set of components within the uniquely designed chamber to reduce problems associated with infusions including, but not limited to, heat exchange, inaccurate temperate readings, improper mixing and emulsion rates, as well as increase the overall abilities that the infuser has to provide including, but not limited to, a wider range of possible finished infusion material consistencies. Further, various electronic features help facilitate the automatic and visual monitoring of the different variables of the infusion process to further assist in reducing problems associated with infusions. This uniquely arranged design allows for other devices to be electrically connected to the infuser base to further assist users with the herbal infusion process such as, but not limited to, decarboxylating herbal grinders, herbal wax decarboxylation chambers and silicone lined heating chambers. Another objective of the present invention is to provide an herbal infusion and decarboxylation device that facilitates the safe handling of the infused product after the infusion process as well as the maintenance of the present invention.

Another objective of the present invention is to provide users with a uniquely designed infusion chamber lid capable of accepting infusion attachments that further improve the user's ability to produce a wider range of infusion material consistencies that increases the overall finished infused food possibilities. This enables a wider range of possible finished infusion material consistencies and helps reduce unwanted problems associated with infusions including but not limited to odors caused from the decarboxylation and infusion process. Additional features and benefits of the present invention are further discussed in the sections below.

SUMMARY OF THE INVENTION

The present invention provides an herbal infusion and decarboxylation device that facilitates the decarboxylation and infusion of different herbal materials into butters and oils in an efficient and more controlled manner. The present invention provides users with the ability to visually monitor and measure infusion material concentration levels during operation to ensure and maintain more precise infusions. The present invention also provides users with the ability to produce a wider range of finished infused material consistencies to further increase the overall finished infused food possibilities. Further, the present invention provides users with a uniquely arranged set of components to reduce problems associated with infusions including but not limited to infusion odors, heat exchange and emulsion rates.

Further, the present invention provides users with an infusion device capable of manually and electrically connecting various other devices to increase the overall ability to control the wide range of infusion and decarboxylation variables during the infusion and decarboxylation process. The present invention includes an infusion and decarboxylation chamber designed to facilitate the visual monitoring and measuring of the infusion and decarboxylation process by the user. The infusion chamber also facilitates the handling of the infusion materials before, during, and after the infusion process to protect the infusion materials as well as to protect the user. Further, the infusion chamber is designed to house the elements in the interior bottom of the chamber that are necessary for the infusion process including, but not limited to, at least one set of blades, at least one heating plate, as well as means to monitor the interior operation of the different elements. Further, the infusion chamber is equipped with a lid assembly that allows the usage of different accessories to facilitate the infusion process including, but not limited to, a blade reduction screen, odor control cartridge receptacle, and mesh strainer. Furthermore, the present invention includes an infusion mechanism that enables the user to control the operation of the different elements of the infusion mechanism based on the current conditions of the infusion materials during the infusion process.

The present invention enables the user to control different variables including, but not limited to, the herbal emulsion rates, the timing as well as the heating of the infusion materials during the infusion process to accommodate the infusion material's infusion requirements. The monitoring and measuring of the decarboxylation and infusion process can be automatic based on the user's preset preferences or can be directly configured by the user before and or during the infusion and decarboxylation process. The present invention ensures that the infusion settings are maintained during the infusion process in order to achieve a properly infused product that meets user's wide range of infusion criteria.

DETAIL DESCRIPTIONS OF THE INVENTION

Figure 1:
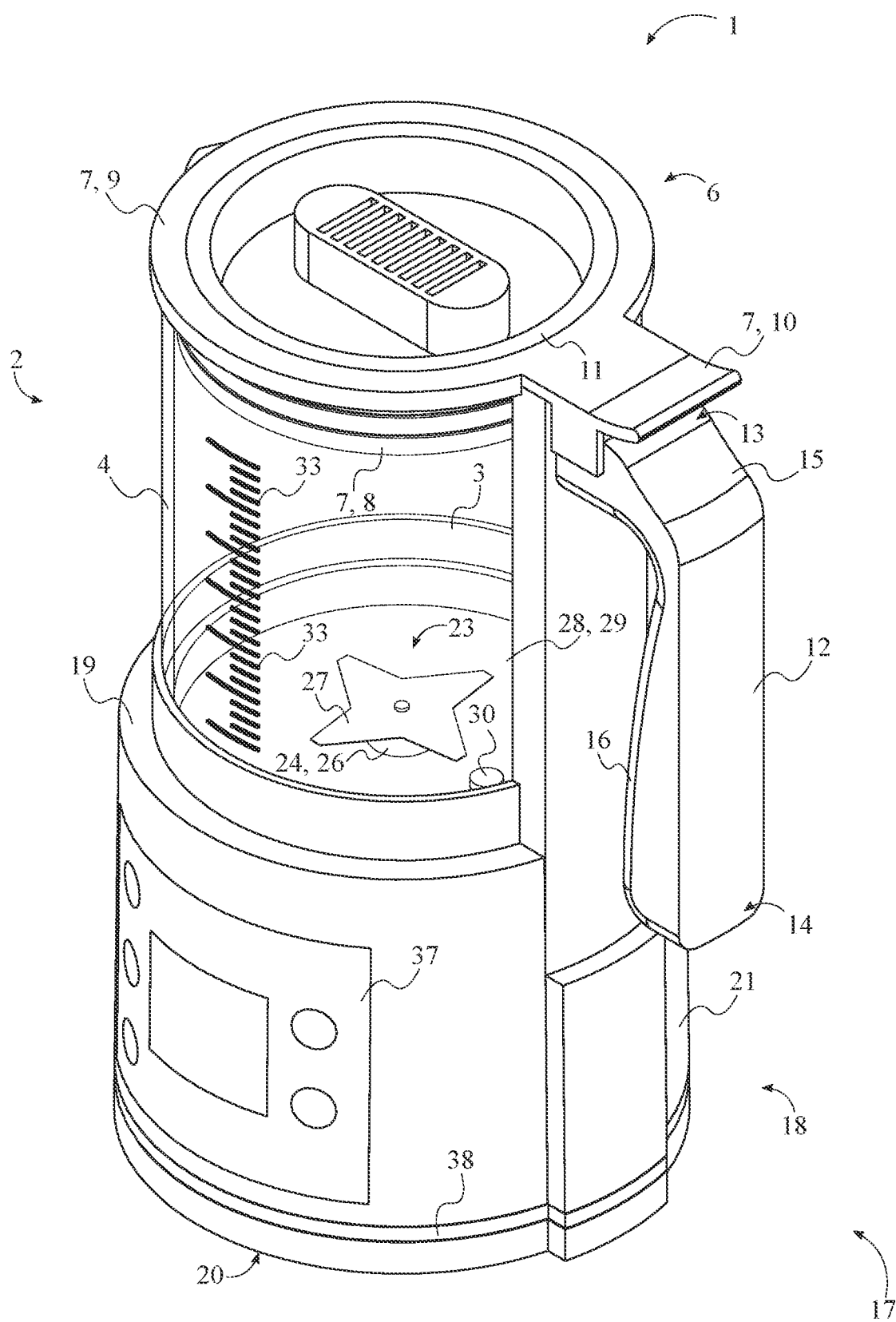
FIG. 1 is a top-front perspective view of the present invention.
Figure 2:
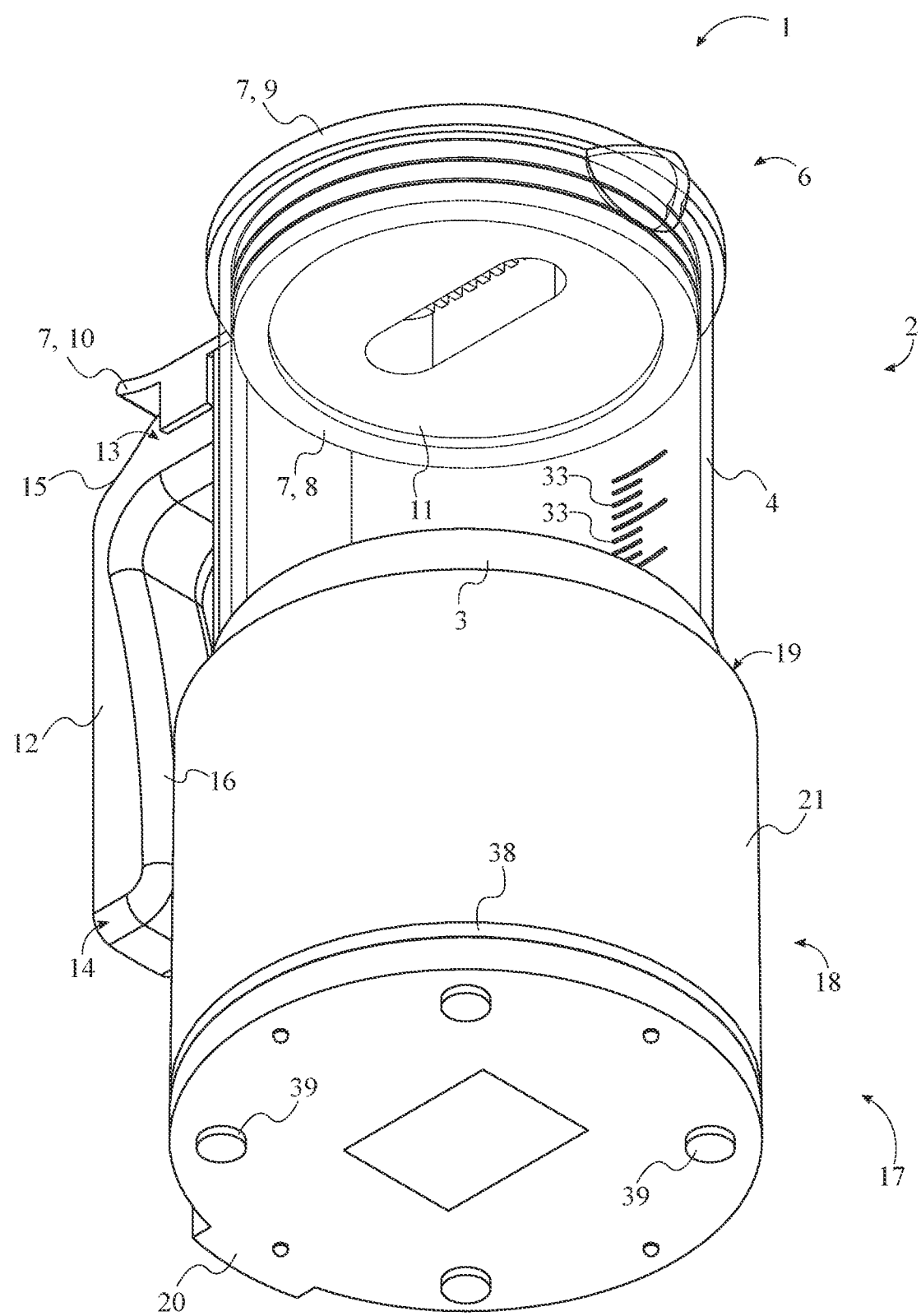
FIG. 2 is a bottom-rear perspective view of the present invention.
Figure 3:
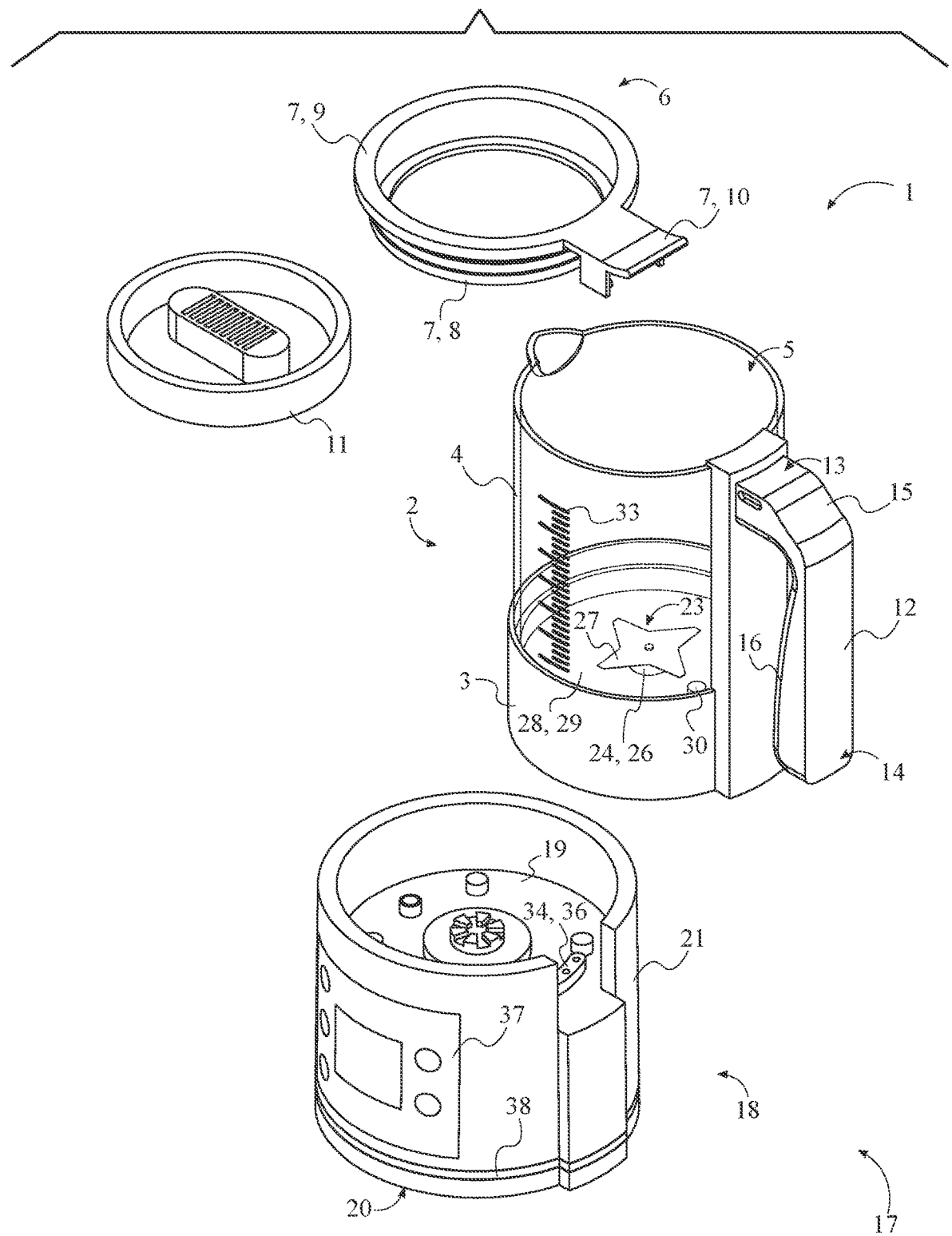
FIG. 3 is a top-front exploded perspective view of the present invention.
Figure 4:
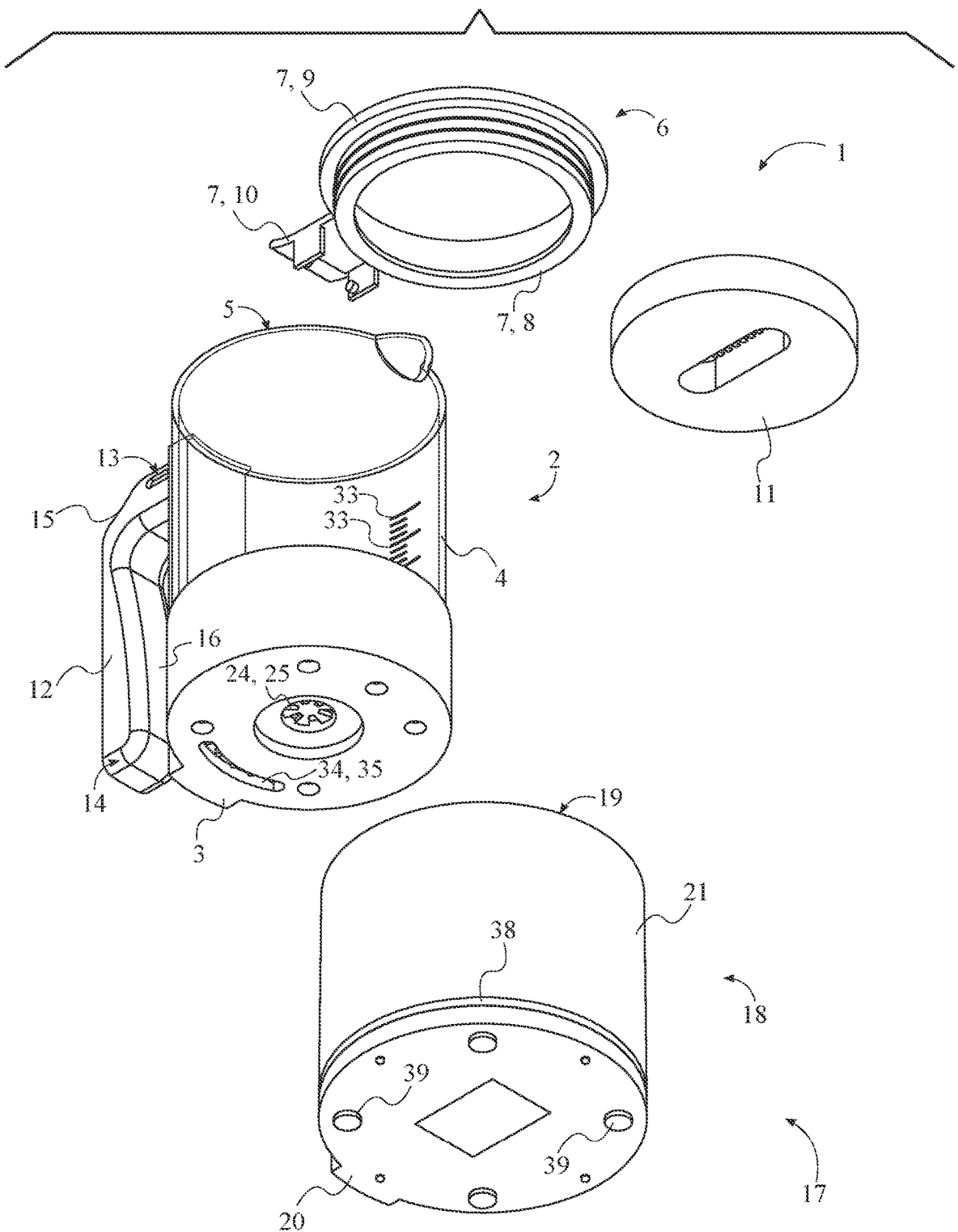
FIG. 4 is a bottom-rear exploded perspective view of the present invention.
Figure 5:
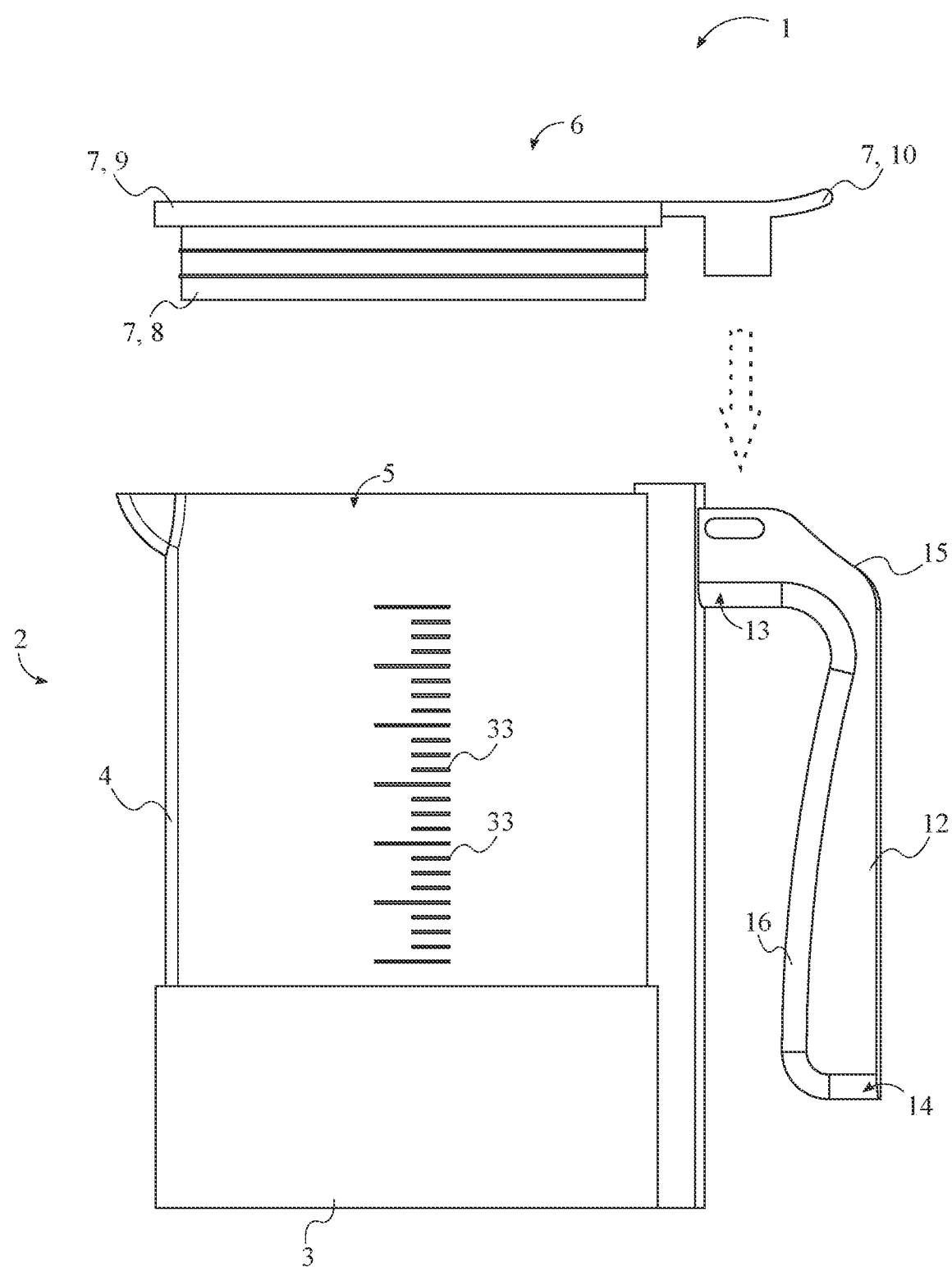
FIG. 5 is a front view of the infusion chamber of the present invention, wherein the lid assembly is shown removed using the thumb tab.
Figure 6:
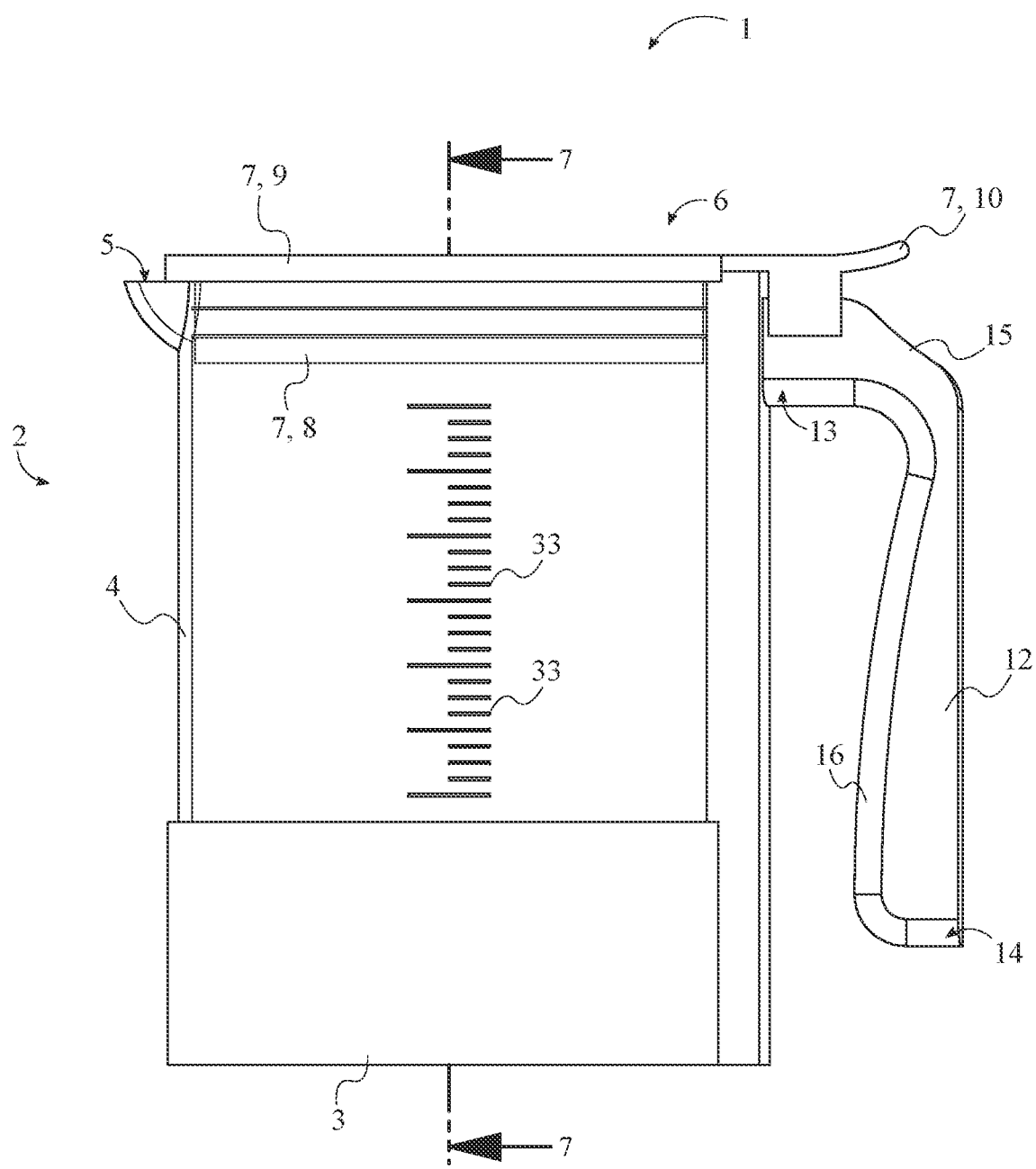
FIG. 6 is a front view of the infusion chamber of the present invention.
Figure 7:
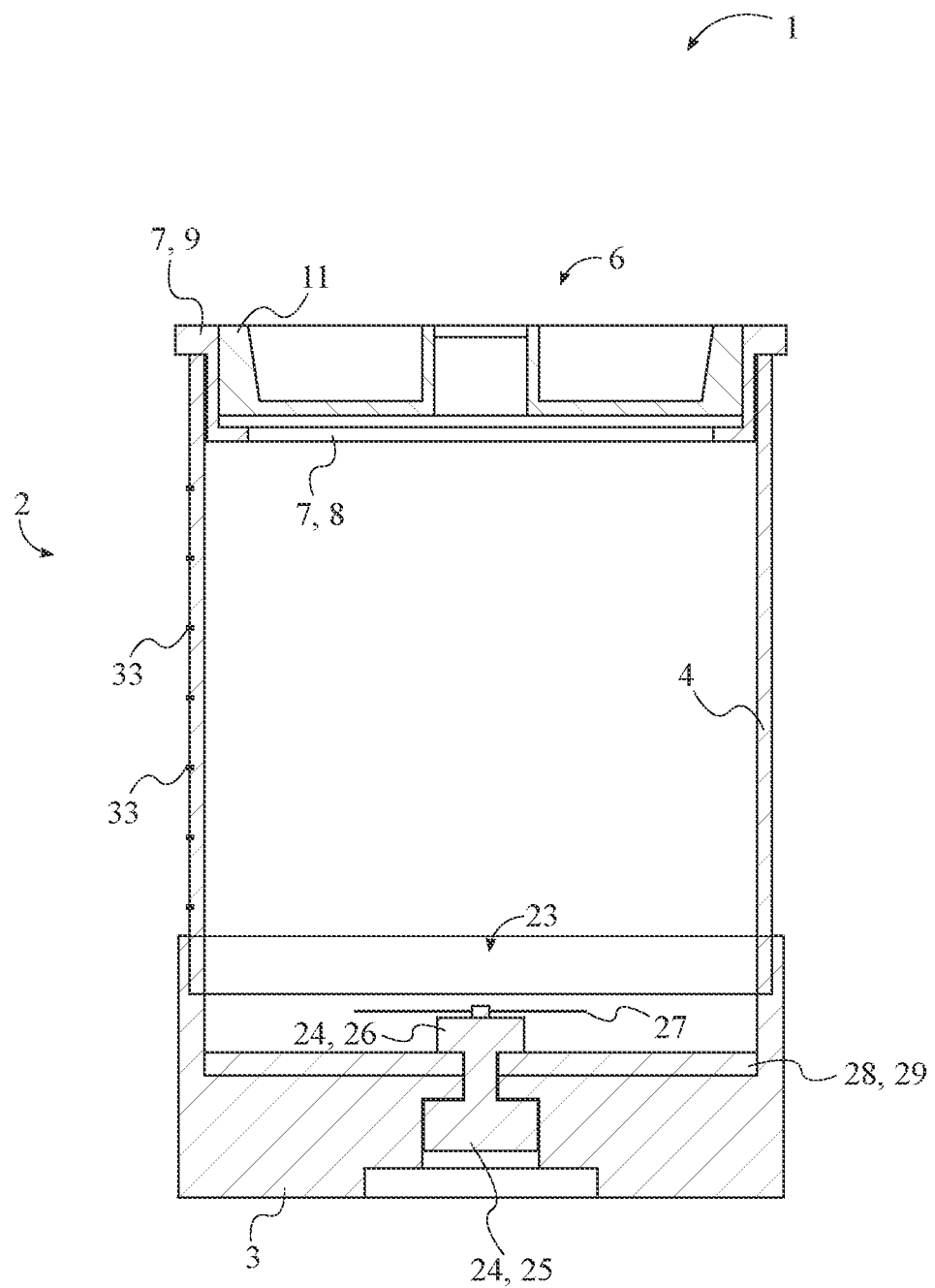
FIG. 7 is a vertical cross-sectional view taken in the direction of line 7-7 in FIG. 6.
Figure 8:
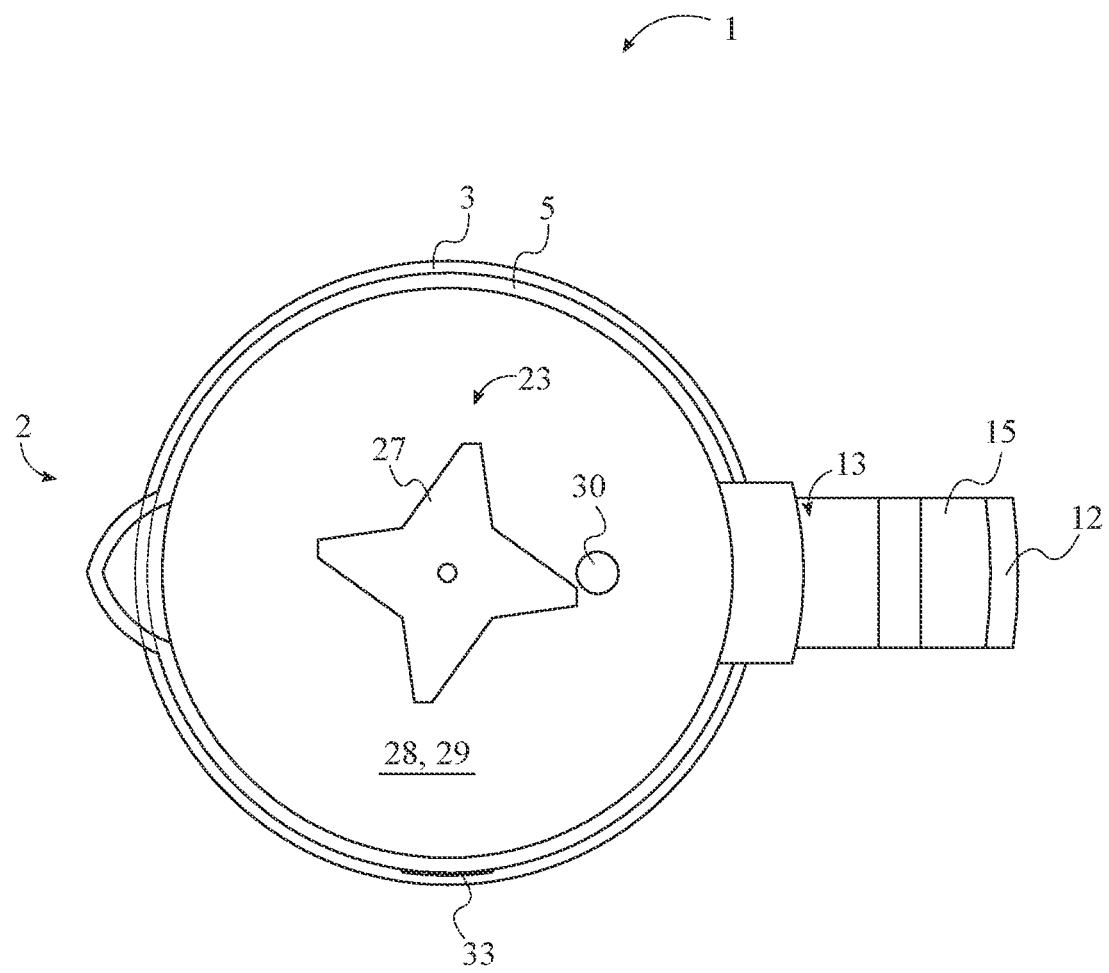
FIG. 8 is a top view of the infusion chamber of the present invention, wherein the lid assembly is shown removed.
Figure 9:
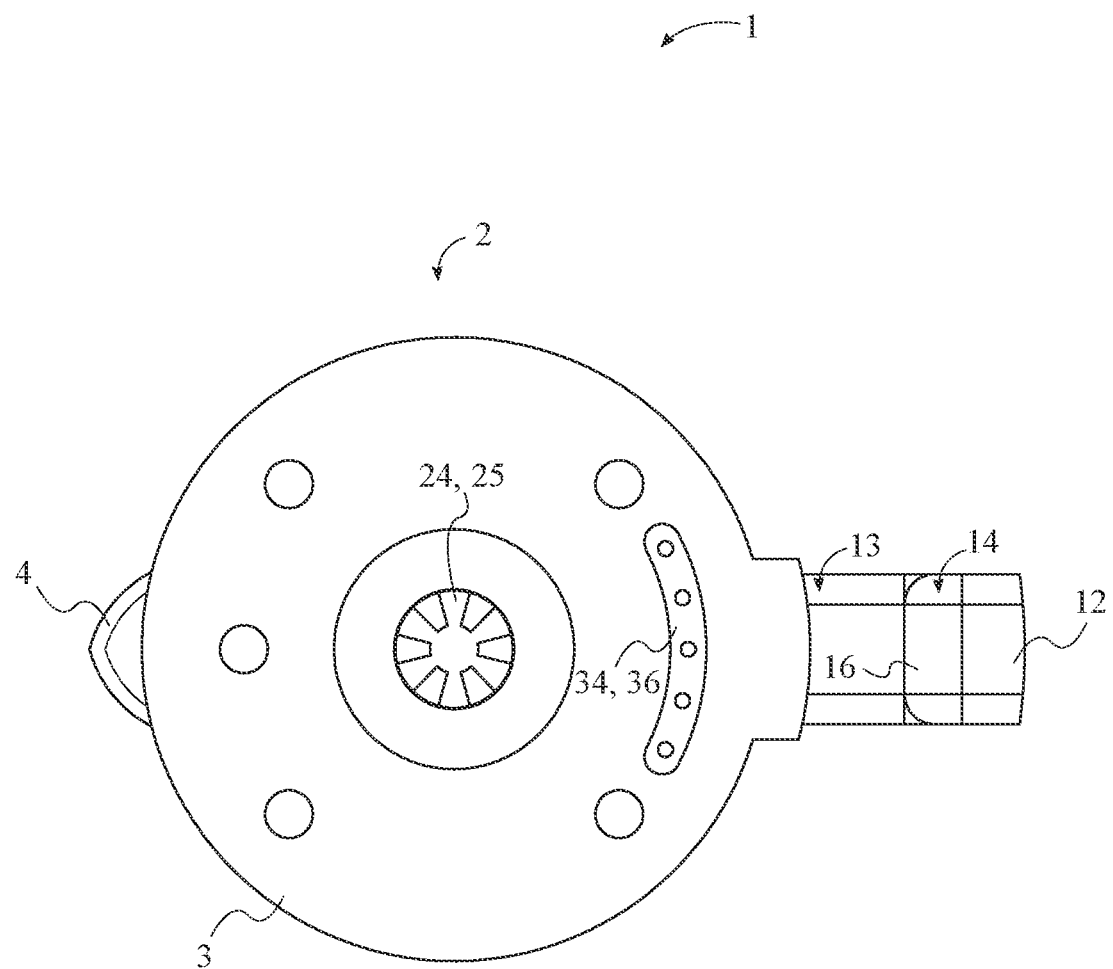
FIG. 9 is a bottom view of the infusion chamber of the present invention, wherein the lid assembly is shown removed.

All illustrations of the drawings are for the purpose of describing selected versions of the present invention and are not intended to limit the scope of the present invention.

The present invention is an herbal infusion and decarboxylation device that enables the user to have more control over the infusion process of different infusion materials to make a high-quality product. The present invention enables the herbal infusion of different products including, but not limited to, butters, oils, and materials used to make infused tinctures. As can be seen in FIGS. 1 through 4, the present invention comprises an infusion chamber 1, an infusion mechanism 17, a controller 31, and a power source 32. The infusion chamber 1 serves to retain the different infusion materials during the infusion process in such a way that the user can monitor and measure the conditions of the infusion materials during the infusion process. The infusion mechanism 17 enables the user to control the infusion process more accurately in order to produce an infused product of higher quality. The controller 31 enables the automatic and/or manual control of different variables of the infusion process. The power source 32 provides the voltage necessary for the operation of the infusion mechanism 17 and the controller 31.

The general configuration of the aforementioned components enables the user to efficiently make different infused products by having more control over the infusion materials during the infusion process. As can be seen in FIGS. 1 through 4, the infusion chamber 1 is designed to enable the user to visually monitor and measure the infusion process while facilitating the handling of the infusion materials before, during, and after the infusion process. To do so, the infusion chamber 1 comprises a chamber body 2, a lid assembly 6, and chamber handle 12. The chamber body 2 is a transparent and hollow body large enough to retain an amount of infusion materials. The lid assembly 6 is designed to facilitate the infusion process by utilizing various attachments as well as contain the infused materials. The chamber handle 12 facilitates the safe handling of the chamber body 2 before, during, and after the infusion process. Further, the infusion mechanism 17 comprises a housing 18, a motor 22, a blade assembly 23, at least one heating plate 28, and at least one temperature sensor 30. The housing 18 serves to retain the motor 22, the controller 31, and the power source 32. The housing 18 also serves as a mount for the infusion chamber 1. The motor 22 generates the torque necessary to spin the blade assembly 23 which facilitates the infusion process of the infusion materials. In addition, the at least one heating plate 28 enables the controlled heating of the infusion materials retained within the infusion chamber 1 during the infusion process. The at least one temperature sensor 30 helps monitor the temperature of the interior of the chamber body 2 to adjust the heating of the at least one heating plate 28. This way, the infusion materials are heated to a predetermined temperature set by the user. The at least one temperature sensor 30 also enables the user to adjust the temperature of the at least one heating plate 28 during the infusion process if necessary.

As can be seen in FIGS. 1 through 4, the overall assembly of the present invention forms a compact structure that is easy to operate and easy to use. To assemble the present invention, the chamber body 2 is mounted onto the housing 18 so that the blade assembly 23 can be coupled to the motor 22. The lid assembly 6 is mounted onto the chamber body 2, opposite to the housing 18, to seal the chamber body 2 as well as to secure different accessories to the chamber body 2 that can be used with the infusion chamber 1. Further, the chamber handle 12 is laterally mounted to the chamber body 2 in between the housing 18 and the lid assembly 6. This way, the user can handle the chamber body 2 by the chamber handle 12 without directly touching the chamber body 2. On the other hand, the motor 22 and the controller 31 are mounted within the housing 18 so that the motor 22 and the controller 31 are not exposed to the surroundings. Further, the blade assembly 23, the at least one heating plate 28, and the at least one temperature sensor 30 are mounted within the chamber body 2, adjacent to the housing 18. This ensures that the blade assembly 23, the at least one heating plate 28, and the at least one temperature sensor 30 are in contact with the infusion materials during the infusion process. Furthermore, to connect the motor 22 to the blade assembly 23, the motor 22 is operatively coupled to the blade assembly 23, wherein the motor 22 is used to rotationally drive the blade assembly 23. The motor 22 can be coupled to the blade assembly 23 in different ways, such as the motor 22 including a shaft that terminally connects to the blade assembly 23 in such a way that the torque generated by the motor 22 is transferred to the blade assembly 23 by the shaft.

Figure 18:
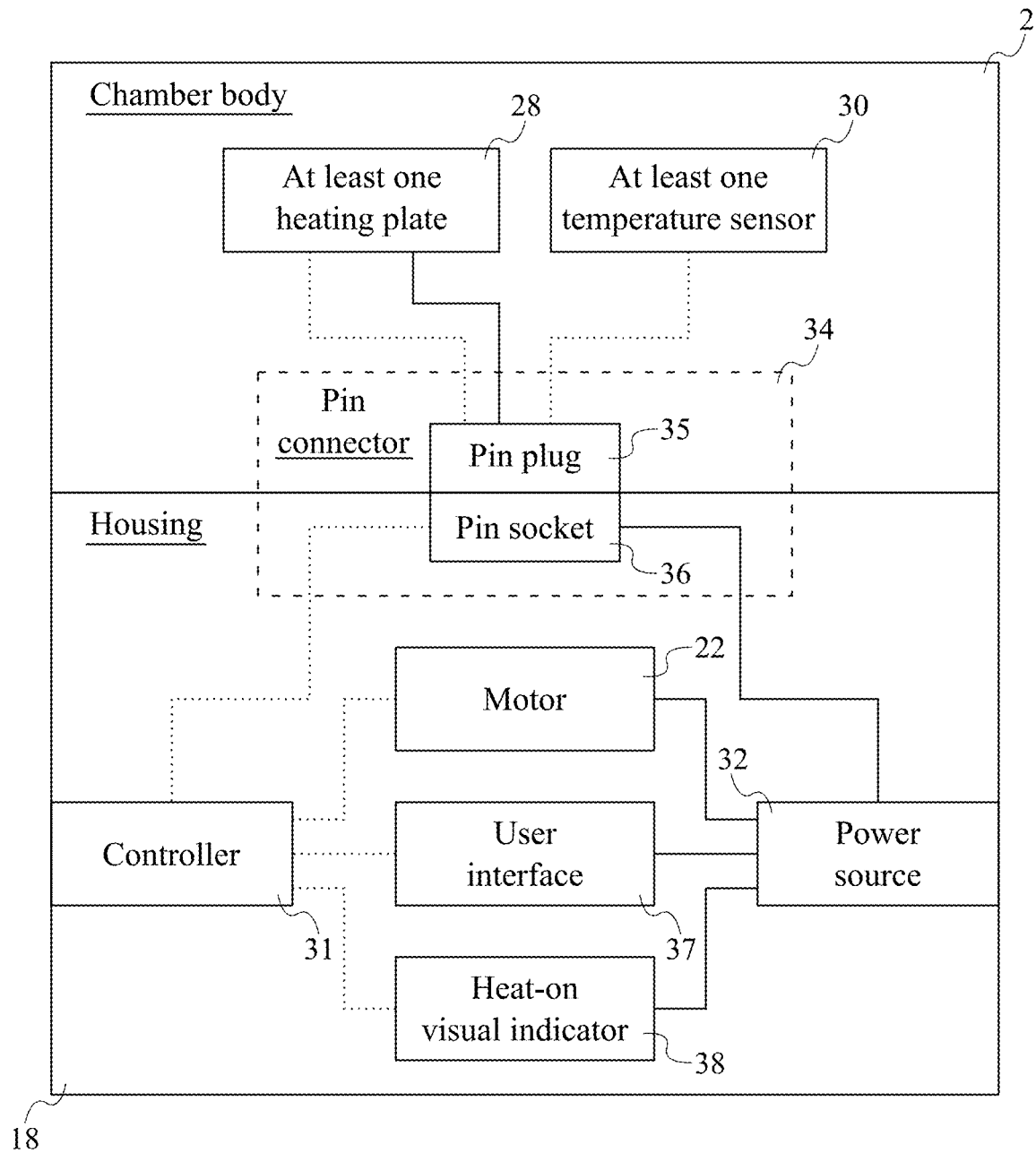
FIG. 18 is a schematic view of the electrical connections and the electronic connections of the present invention, wherein the electrical connections are shown in solid lines, and wherein the electronic connections are shown in dotted lines.

As can be seen in FIG. 18, to enable the automatic operation of the different electronic components, the motor 22, the at least one heating plate 28, and the at least one temperature sensor 30 are electronically connected to the controller 31. This enables the transmission of operational signals from the controller 31 to the electronic components so that the motor 22, the at least one heating plate 28, and the at least one temperature sensor 30 operate under predetermined operational settings set by the user. Further, the motor 22 and the at least one heating plate 28 are electrically connected to the power source 32 so that both the motor 22 and the at least one heating plate 28 receive the voltage necessary for operation. Furthermore, the at least one temperature sensor 30 is in thermal communication with the chamber body 2. The at least one temperature sensor 30 is positioned within the chamber body 2 in such a way that the core temperature within the chamber body 2 is monitored using the at least one temperature sensor 30. This way, an accurate temperature of the interior of the chamber body 2 and the infusion materials can be monitored in real-time. The controller 31 can adjust the heating of the at least one heating plate 28 automatically if the temperature of the interior of the chamber body 2 does not meet a predetermined temperature. Alternatively, the user can adjust the heating of the at least one heating plate 28 based on the readings from the at least one temperature sensor 30.

As previously discussed, the infusion chamber 1 is designed to retain different amounts of infusion materials that are used to make an infused product. So, the chamber body 2 is designed to safely retain the infusion materials during the infusion process. As can be seen in FIGS. 3 through 9, the chamber body 2 may comprise a chamber base 3, a chamber lateral wall 4, and a chamber opening 5. The chamber body 2 is preferably a cylindrical hollow structure with an open base. The chamber base 3 preferably corresponds to the closed base of the chamber body 2, while the chamber opening 5 corresponds to the open base. Accordingly, the chamber base 3 is positioned opposite to the chamber opening 5 about the chamber lateral wall 4 due to the cylindrical structure of the chamber body 2. The chamber base 3 is positioned coextensive with the housing 18. The chamber base 3 is also mounted onto the housing 18. This way, the chamber body 2 sits perfectly on top of the housing 18. In addition, the lid assembly 6 is mounted across the chamber opening 5 so that any accessory is secured to the chamber opening 5. Further, the chamber handle 12 is mounted onto the chamber lateral wall 4. This way, the chamber handle 12 does not obstruct the chamber opening 5 nor the chamber base 3 when the chamber body 2 is mounted onto the housing 18. In some embodiments, the chamber body 2 may include a spout positioned adjacent to the chamber opening 5 to facilitate the pouring of the infused products after the infusion process.

The blade assembly 23 is mounted within the chamber body 2 so that the blade assembly 23 mixes and lightly emulsifies the infusion materials for the making of the infused product. As can be seen in FIGS. 3 through 9, the blade assembly 23 may comprise a blade hub 24 and at least one blade 27. The blade hub 24 serves to connect the at least one blade 27 to the motor 22. The at least one blade 27 serves to lightly emulsify and mix the infusion materials in the chamber body 2. The at least one blade 27 is designed to have one or more dull, rounded, pitched blades that reduces the cutting action while thoroughly mixing materials within the chamber body 2. The pitched blade helps push the infusion material down and outwards towards the at least one heating plate 28 which effectively displaces the infusion materials that are stagnating at the bottom of the chamber body 2. The blade hub 24 is preferably a short cylindrical structure that fits in the chamber base 3 to enable the rotation of the at least one blade 27 by the motor 22. The at least one blade 27 is designed to thoroughly mix and lightly emulsify the infusion materials to make a perfectly infused product. The at least one blade 27 is preferably a low emulsion pitched blade, but other types of blades or mixers can be used if necessary. The low emulsion blade is designed to lightly emulsify the infusion materials throughout the chamber body 2.

Accordingly, the blade hub 24 comprises a first hub end 25 and a second hub end 26. The blade hub 24 centrally traverses through the chamber base 3 and the at least one heating plate 28 to transmit the torque from the motor 22 to the at least one blade 27. Further, the first hub end 25 is rotatably connected to the chamber base 3 while the second hub end 26 is rotatably connected to the at least one heating plate 28. This way, the blade hub 24 can freely rotate without leaving any empty space on the chamber base 3 through which the infusion materials can leak. In addition, the motor 22 is operatively coupled to the first hub end 25, wherein the motor 22 is used to rotationally drive the first hub end 25. For example, the shaft of the motor 22 can protrude out of the housing 18 in such a way that when the chamber base 3 is mounted onto the housing 18, the first hub end 25 couples with the end of the shaft. Thus, as the shaft is turned by the motor 22, the first hub end 25 is also rotated, which in turn rotates the at least one blade 27. Finally, the at least one blade 27 is torsionally connected to the second hub end 26 so that the torque transmitted through the blade hub 24 rotates the at least one blade 27.

As can be seen in FIGS. 1 through 7, to further facilitate the making of the infused product, the present invention may further comprise a plurality of markings 33 that correspond to measurement markings provided on the chamber body 2. The chamber body 2 is also preferably made of a transparent material including, but not limited to, tempered glass, that is adequate for retaining hot materials. The transparent chamber body 2 also enables the user to visually monitor the infusion process without having to remove the lid assembly 6. To integrate the plurality of markings 33 on the chamber body 2, the plurality of markings 33 is distributed along the chamber lateral wall 4. The distribution of the plurality of markings 33 preferably correspond to incremental volumetric units of measurements or other markings that help the user produce infused products with more exact herbal to oil ratios. For example, the plurality of markings 33 can include milliliter (ml) and fluid ounce (fl oz) measurement marks to allow visual confirmation of the liquid amounts within the chamber. Further, the plurality of markings 33 is inscribed onto the chamber lateral wall 4 so that the plurality of markings 33 is not removed or damaged during the cleaning of the chamber body 2.

The present invention ensures that the infusion materials are properly heated and mixed during the infusion process to ensure that all the infusion materials are properly infused. As can be seen in FIGS. 6 through 9, the, the at least one heating plate 28 may comprise an annular plate body 29 that fully covers the chamber base 3. By covering the interior chamber base 3, the present invention ensures that all the infusion materials are heated evenly inside the chamber body 2. Accordingly, the annular plate body 29 is positioned coextensive with the chamber base 3. The annular plate body 29 is also mounted onto the chamber base 3 to secure the annular plate body 29 to the chamber base 3. This way, the annular plate body 29 does not come loose during the infusion process. Further, the blade assembly 23 is centrally positioned with the annular plate body 29 so that the blade assembly 23 is not obstructed by the annular plate body 29.

As previously discussed, the present invention enables the user to control the infusion process by controlling the operation of the motor 22 as well as the operation of the at least one heating plate 28. This requires the unobstructed communication between the heating plate and the controller 31 while facilitating the removable mounting of the chamber body 2 to the housing 18. As can be seen in FIGS. 3, 4, 9, and 18 the present invention may further comprise a pin connector 34 that enables the removable coupling between the at least one heating plate 28 and the controller 31. The pin connector 34 comprises a pin plug 35 and a pin socket 36 that enable the removable coupling when the chamber base 3 is removably mounted onto the housing 18. Accordingly, the pin plug 35 is integrated into the chamber body 2, adjacent to the housing 18, while the pin socket 36 is integrated into the housing 18, adjacent to the pin plug 35. The pin plug 35 is preferably integrated into the chamber base 3 while the pin socket 36 is integrated into the base of the housing 18 that receives the chamber body 2. In addition, the housing 18 may include a plurality of guides that ensure that the ping plug aligns with the pin socket 36 when the chamber body 2 is mounted onto the housing 18. Then, once the chamber body 2 is mounted onto the housing 18, the at least one heating plate 28 is electrically connected to the power source 32 through the pin connector 34. Further, the at least one heating plate 28 and the at least one temperature sensor 30 are electronically connected to the controller 31 through the pin connector 34. In other embodiments, the pin connector 34 enables the attachment of different devices to the housing 18 such as but not limited to, an electric heating chamber with detachable silicone liners that helps user temper chocolate, warm up edibles, etc.

The housing 18 preferably has a shape and size that matches the shape and size of the chamber body 2. As can be seen in FIGS. 1 through 4, the housing 18 preferably has an overall cylindrical structure. Accordingly, the housing 18 may comprise a first housing base 19, a second housing base 20, and a housing lateral wall 21. The first housing base 19 and the second housing base 20 preferably correspond to the closed bases of the cylindrical structure of the housing 18. So, the first housing base 19 is positioned opposite to the second housing base 20 about the housing lateral wall 21 due to the cylindrical shape of the housing 18. Further, the chamber body 2 is centrally mounted onto the first housing base 19, thus forming an overall cylindrical structure with the infusion chamber 1.

As can be seen in FIGS. 1 through 4 and 18, to enable the control of the operation of the present invention, the present invention may further comprise a user interface 37. The user interface 37 enables the user to configure the operational settings of the present invention, such as the speed of the blade assembly 23, the heating temperature of the at least one heating plate 28, the timing of the infusion process, etc. To do so, the user interface 37 is integrated into the housing lateral wall 21 so that the user interface 37 is accessible to the user. The user interface 37 is electronically connected to the controller 31 so that the user can input operational signals through the user interface 37 using the user interface 37. Further, the user interface 37 is electrically connected to the power source 32 to control the power being transmitted to the corresponding electrical components. For example, the user interface 37 can include a power button which the user can press to turn on and off the present invention. The controller 31 can be programmed to perform different functions which can be selected and activated on the user interface 37. For example, the present invention can include a decarboxylation setting that is preconfigured during the manufacturing process. The decarboxylation setting can include heating the at least one heating plate 28 to 250 degrees Fahrenheit for 30 minutes. The user can adjust the timing and temperature of the decarboxylation process if necessary. Furthermore, additional settings can be provided for the infusion of different infusion products including, but not limited to, butters, oils, and tinctures. The present invention can also include settings that help with the maintenance of the present invention. For example, the user interface 37 can include a cleaning function to help with the cleaning of the chamber body 2. All settings can be modified by the user using the user interface 37.

Further, the present invention includes different means to indicate the user of the operation of the present invention. For example, the present invention can alert the user when the chamber body 2 is hot and dangerous to handle directly. As can be seen in FIGS. 1 through 4 and 18, the present invention may further comprise a heat-on visual indicator 38. The heat-on visual indicator 38 is designed to clearly show the user that the chamber body 2 is hot so that the user may use precaution when handling the chamber body 2 once the infusion process is completed. The heat-on visual indicator 38 is positioned around the housing lateral wall 21. The heat-on visual indicator 38 can include a Light-Emitting Diode (LED) back lit screen that surrounds the housing lateral wall 21. In addition, the heat-on visual indicator 38 is positioned adjacent to the second housing base 20 so that the user has a clear view of the heat-on visual indicator 38. Further, the heat-on visual indicator 38 is integrated into the housing lateral wall 21 to secure the heat-on visual indicator 38 to the housing 18. The heat-on visual indicator 38 is also electronically connected to the controller 31 to receive operational signals from the controller 31. For example, when the at least one temperature sensor 30 detects a high temperature within the chamber body 2, the sensor signals are transmitted to the controller 31 which processes the sensor signals. If the controller 31 analyses that the sensor signals correspond to a high temperature in the chamber body 2, the controller 31 triggers the heat-on visual indicator 38 to turn on to indicate the user that the chamber body 2 is hot. Furthermore, the heat-on visual indicator 38 is electrically connected to the power source 32 to provide the voltage necessary for the operation of the heat-one visual indicator. In other embodiments, other visual indicators can be provided on the chamber body 2 to indicate the conditions of the chamber body 2.

Furthermore, the present invention may further comprise a plurality of legs 39 that protects the surface on which the present invention is placed on. As can be seen in FIGS. 1 through 4, the plurality of legs 39 can made from different materials that prevent the slippage of the housing 18 while placed on the surface, such as silicone or similar anti-slip materials that also protect the surface. Further, the plurality of legs 39 can be designed to limit the transmission of vibrations generated by the motor 22 to the surface on which the housing 18 is placed on. To do so, the plurality of legs 39 is distributed across the second housing base 20 to evenly receive the weight of the housing 18 and the infusion chamber 1. Furthermore, the plurality of legs 39 is mounted onto the second housing base 20, opposite the housing lateral wall 21, to secure the plurality of legs 39 to the housing 18.

As previously discussed, the lid assembly 6 is designed to enable the user to attach different accessories to the chamber body 2 to facilitate the making of different infused products. As can be seen in FIGS. 1 through 4, the lid assembly 6 may further comprise a cover holder 7 and a removable cover 11. The cover holder 7 is designed to secure the different accessories to the chamber body 2, while the removable cover 11 serves to seal the cover holder 7 as well as to firmly secure the accessories into the correct position within the cover holder 7. Further, the cover holder 7 comprises a holder lip 8 and a holder flange 9. The holder lip 8 is designed to facilitate the hermetical attachment of the removable cover 11 to the chamber body 2. The holder flange 9 enables the attachment of the different accessories to the chamber body 2. To attach the cover holder 7 to the chamber body 2, the holder flange 9, the holder lip 8, and the removable cover 11 are centrally positioned with each other so that the lid assembly 6 can fit in the chamber opening 5. The holder lip 8 is perpendicularly connected to the holder flange 9. In addition, the holder lip 8 is hermetically attached into the chamber opening 5. This way, the cover holder 7 is secured to the chamber body 2 while preventing any fluid from exiting the chamber body 2. Furthermore, the removable cover 11 is hermetically attached onto the holder flange 9 to seal the center of the cover holder 7 when the cover holder 7 is attached to the chamber body 2. In other embodiments, the removable cover 11 may include at least one vent that enables fumes to safely escape through the lid assembly 6 when the removable cover 11 is attached into the cover holder 7.

In some embodiments, the lid assembly 6 includes means to aid with the removal of the lid assembly 6 from the chamber opening 5. As can be seen in FIGS. 1 through 4, the cover holder 7 may further comprise a thumb tab 10 that facilitates with the removal of the lid assembly 6 from the chamber opening 5. The thumb tab 10 also helps to further secure the lid assembly 6 to the chamber handle 12 during the infusion process. To do so, the chamber handle 12 comprises a first handle end 13 and a second handle end 14 due to the elongated shape of the chamber handle 12. The chamber handle 12 is preferably an elongated structure that is attached at one end to the chamber body 2 while the other end is free. This enables the user to easily grab onto the chamber handle 12 to maneuver the chamber body 2 without directly touching the chamber body 2. Accordingly, the first handle end 13 is positioned adjacent to the chamber opening 5. The first handle end 13 is also externally mounted onto the chamber lateral wall 4 to secure the chamber handle 12 to the chamber body 2. On the other hand, the second handle end 14 is positioned adjacent to the chamber base 3 without being connected to the chamber body 2. However, in some embodiments, the second handle end 14 can be connected to the chamber body 2. Furthermore, the thumb tab 10 is peripherally connected to the holder flange 9 so that the user can pull on the holder flange 9 using the thumb tab 10. Finally, the thumb tab 10 is removably connected to the first handle end 13 when the user mounts the lid assembly 6 onto the chamber opening 5. Then, to remove the lid assembly 6, the user pulls on the thumb tab 10 to release the thumb tab 10 from the first handle end 13 and then the user can remove the lid assembly 6 from the chamber opening 5.

Further, to help the user to securely handle the chamber body 2, the chamber handle 12 may further comprise a thumb rest 15 and an anti-slip feature 16. As can be seen in FIGS. 1 through 4, the thumb rest 15 and the anti-slip feature 16 enables the user to safely hold the chamber body 2, especially when the infused product and the chamber body 2 are still hot after the infusion process. To do so, the thumb rest 15 is positioned adjacent to the first handle end 13. The thumb rest 15 is also integrated into the chamber handle 12, opposite to the chamber lateral wall 4. Thus, the thumb rest 15 increases the comfort of holding the chamber handle 12 and reduces thumb slippage while pouring out hot substances. The silicone surface of the thumb rest 15 combined with the curvature of the thumb rest 15 allows for more control while pouring. Furthermore, the anti-slip feature 16 is positioned adjacent to the second handle end 14. The anti-slip feature 16 is also integrated into the chamber handle 12, adjacent to the chamber lateral wall 4. This way, when the user grabs the chamber handle 12, the user's fingers comfortably and securely rest on the anti-slip feature 16. The anti-slip feature 16 can be a round protrusion with a plurality of protrusions such as rings or ridges that prevent the user from losing grip when holding the chamber handle 12.

Figure 10:
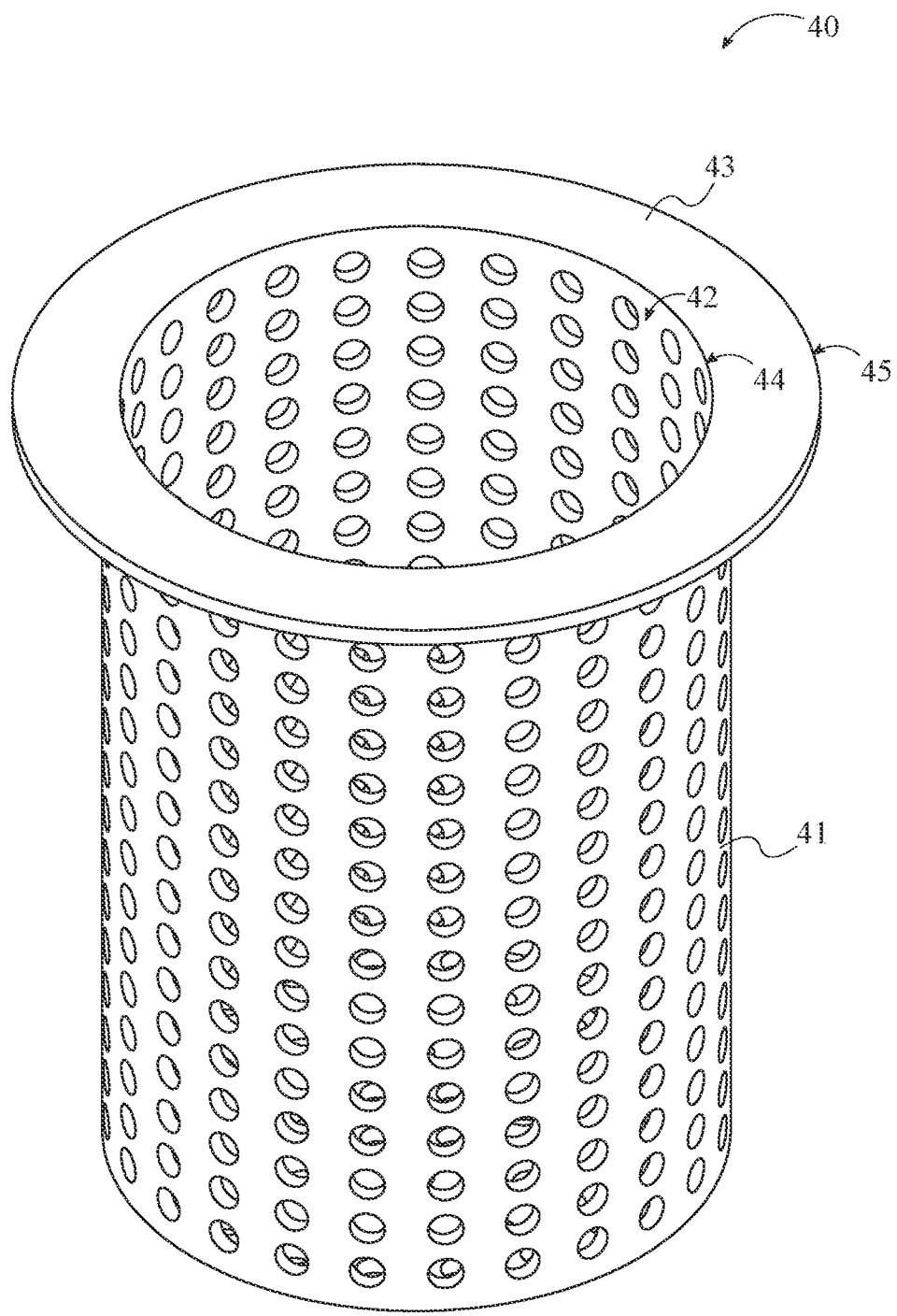
FIG. 10 is a top-front perspective view of the mesh strainer of the present invention.
Figure 11:
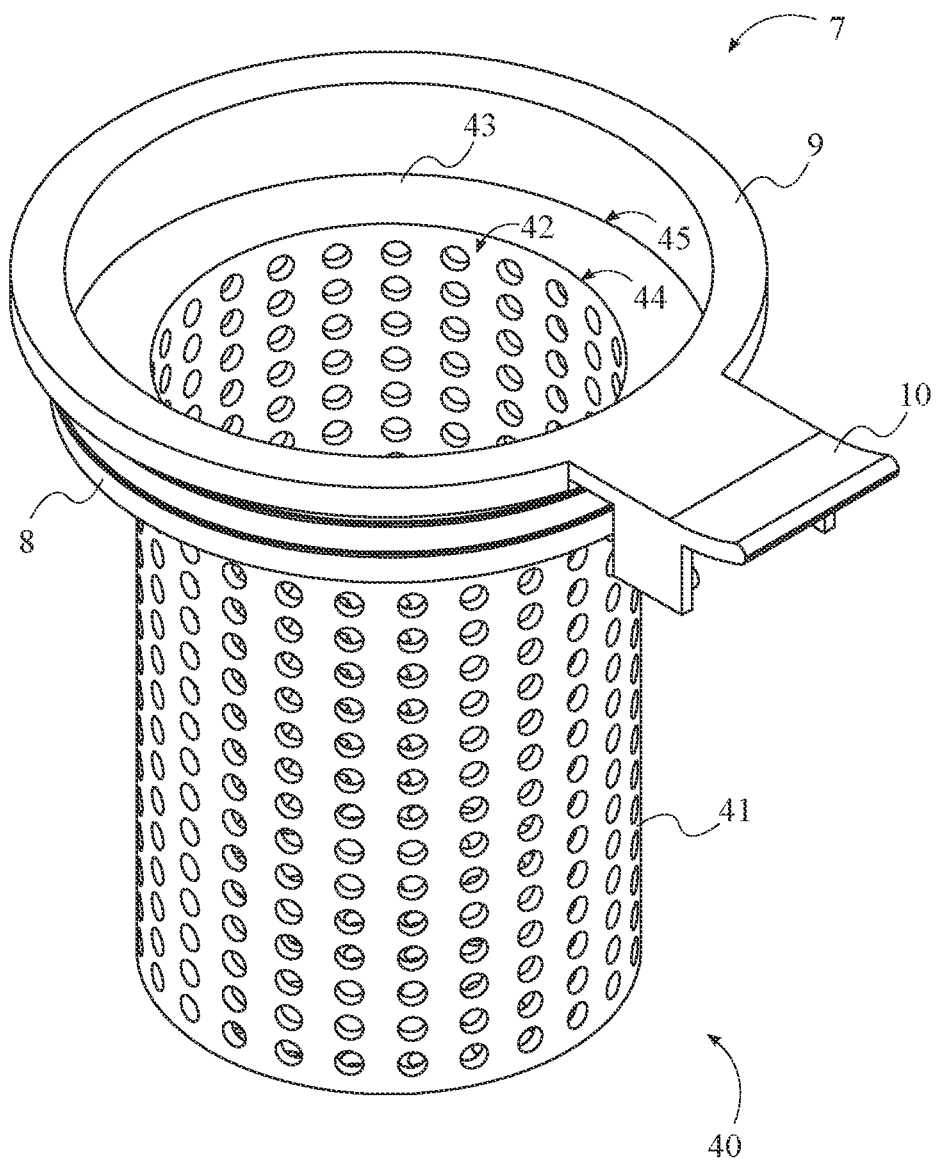
FIG. 11 is a top-front perspective view of the mesh strainer of the present invention, wherein the mesh strainer is shown attached into the cover holder of the lid assembly.

As previously discussed, the cover holder 7 enables the attachment of different accessories to the chamber body 2. In one embodiment, the present invention may further comprise a mesh strainer 40. As can be seen in FIGS. 10 and 11, the mesh strainer 40 is designed to enable the user to remove unwanted infusion materials from the infused product after the infusion process. For example, the mesh strainer 40 can be used to separate the herbs and other similar ingredients from the oil. To do so, the mesh strainer 40 comprises a mesh receptacle 41 and a mesh ring 43. The mesh receptacle 41 preferably corresponds to the mesh body while the mesh ring 43 corresponds to the structure that secures the mesh body to the cover holder 7. Further, the mesh ring 43 comprises an inner ring edge 44 and an outer ring edge 45 corresponding to the edges of the mesh ring 43. The mesh ring 43 is connected around a receptacle opening 42 of the mesh receptacle 41 to form an overall T-shaped structure. Further, the mesh receptacle 41 is positioned into the chamber body 2 while the mesh ring 43 is attached onto the holder flange 9. This way, the user can hold onto the cover holder 7 while pouring the infused product into the mesh strainer 40 to remove the unwanted infusion materials from the infusion product.

Figure 12:
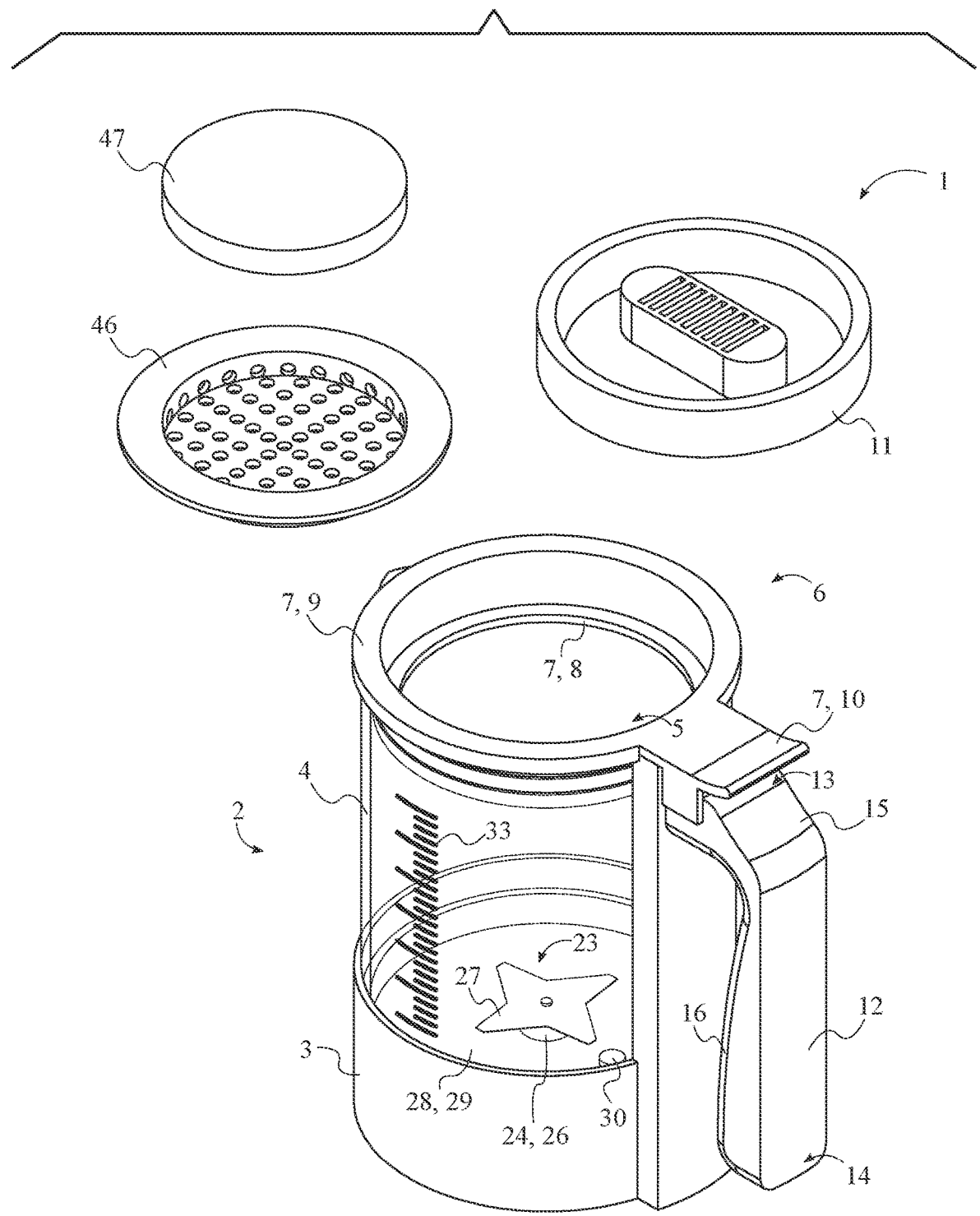
FIG. 12 is a top-front exploded perspective view of the infusion chamber of the present invention, wherein the infusion chamber is shown with a cartridge receptacle and an odor control cartridge.
Figure 13:
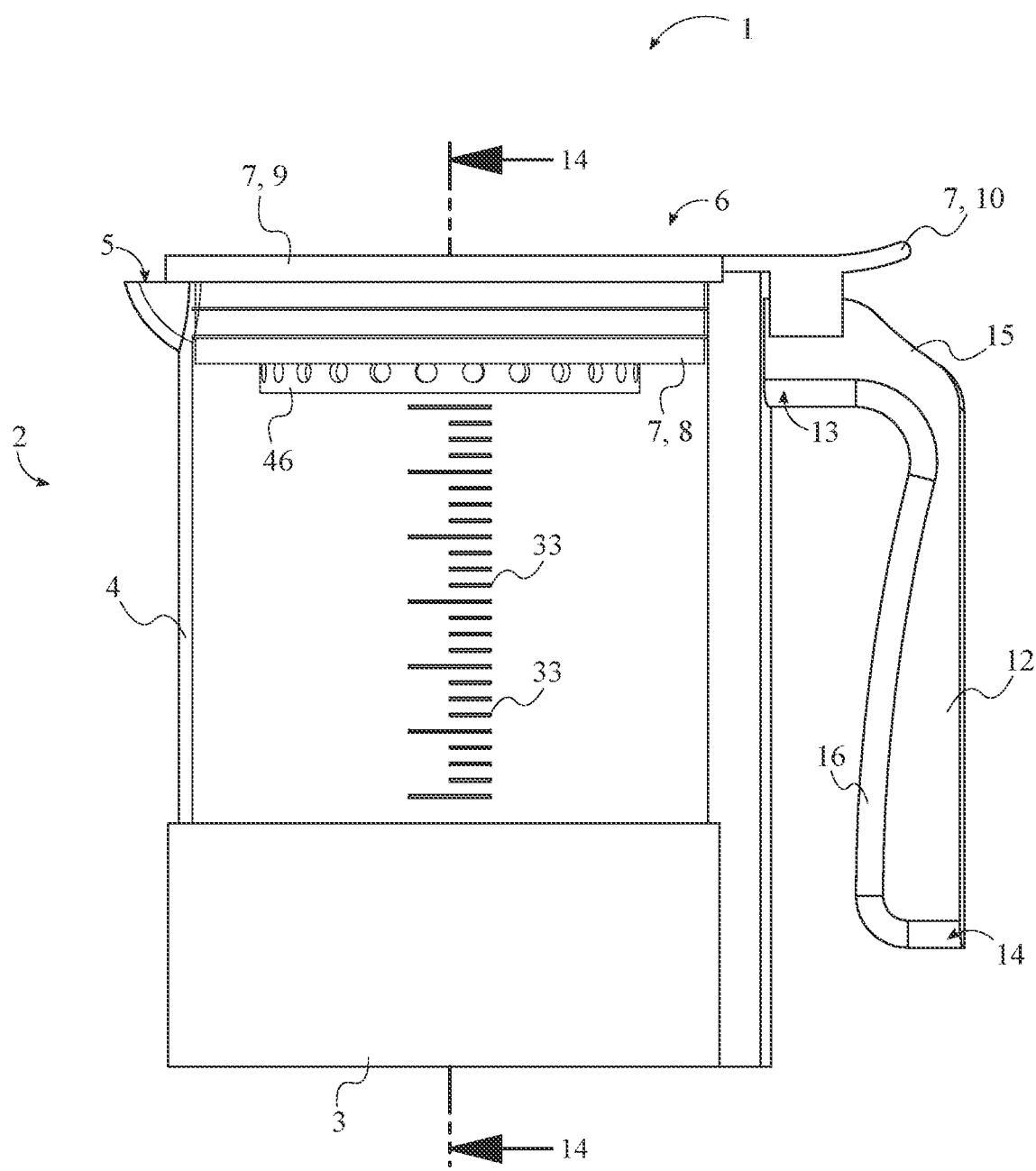
FIG. 13 is a front view of the infusion chamber of the present invention, wherein the infusion chamber is shown with the cartridge receptacle and the odor control cartridge.
Figure 14:
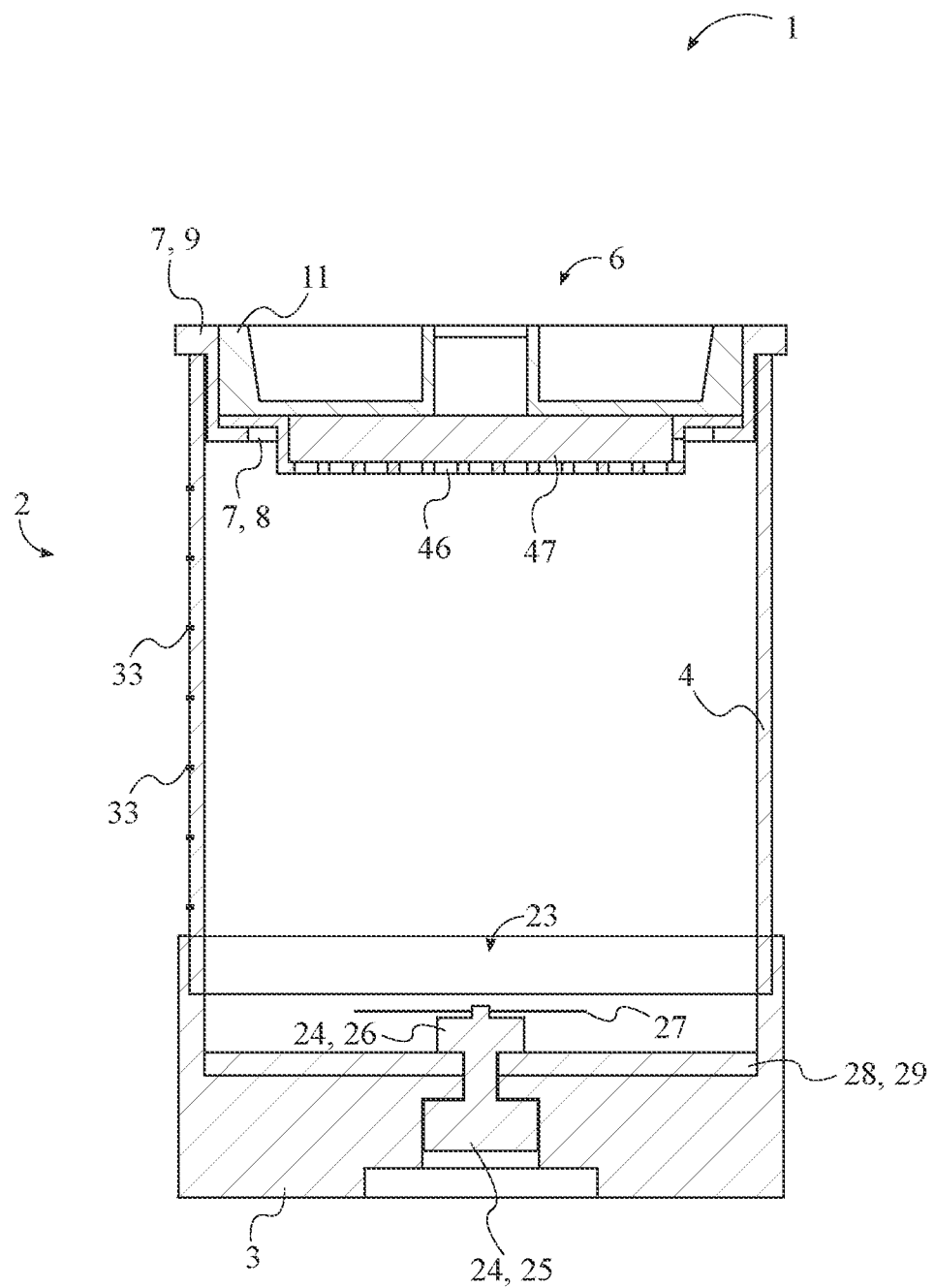
FIG. 14 is a vertical cross-sectional view taken in the direction of line 14-14 in FIG. 13.

In another embodiment, the present invention may further comprise a cartridge receptacle 46 that holds an odor control cartridge 47. As can be seen in FIGS. 12 through 14, the odor control cartridge 47 helps reduce the different odors produced during the infusion and decarboxylation process to keep the surroundings odor-free. To do so, the cartridge receptacle 46 is attached into the holder flange 9 to secure the cartridge receptacle 46 to the cover holder 7. Then, the odor control cartridge 47 is positioned within the cartridge receptacle 46 to maintain the odor control cartridge 47 adjacent to the cover holder 7. Finally, the removable cover 11 is positioned across the cartridge receptacle 46 to seal the cartridge receptacle 46. This way, when the user starts the infusion process, the odor control cartridge 47 traps the producing odors and then allows the odors to escape the chamber body 2 through the odor control cartridge 47 which reduces the smells associated with the decarboxylation and infusion process. For example, the odor control cartridge 47 reduces the aromatic hydrocarbons of the decarboxylation and infusion process while allowing proper ventilation of the chamber body 2.

Figure 15:
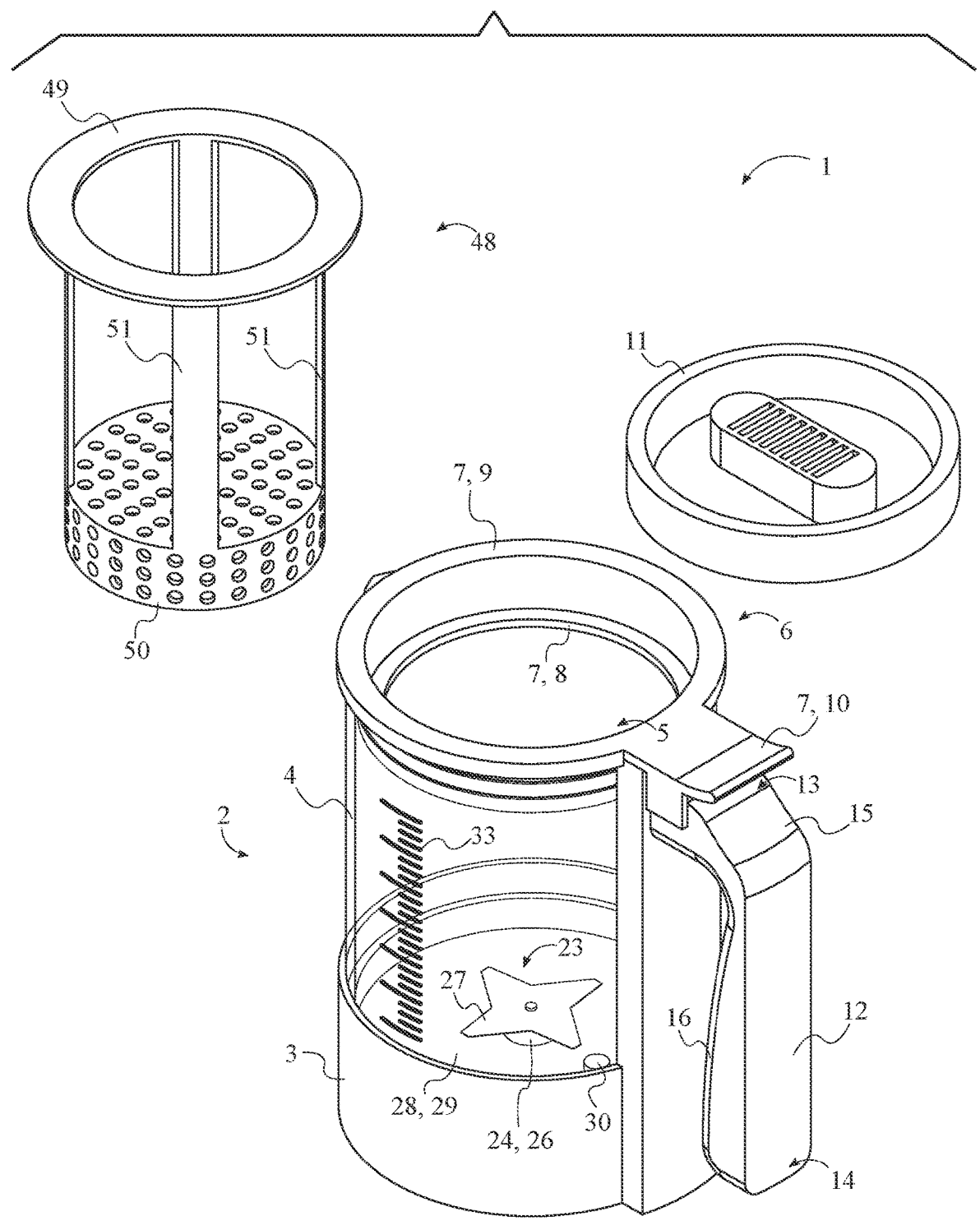
FIG. 15 is a top-front exploded perspective view of the infusion chamber of the present invention, wherein the infusion chamber is shown with a blade reduction screen.
Figure 16:
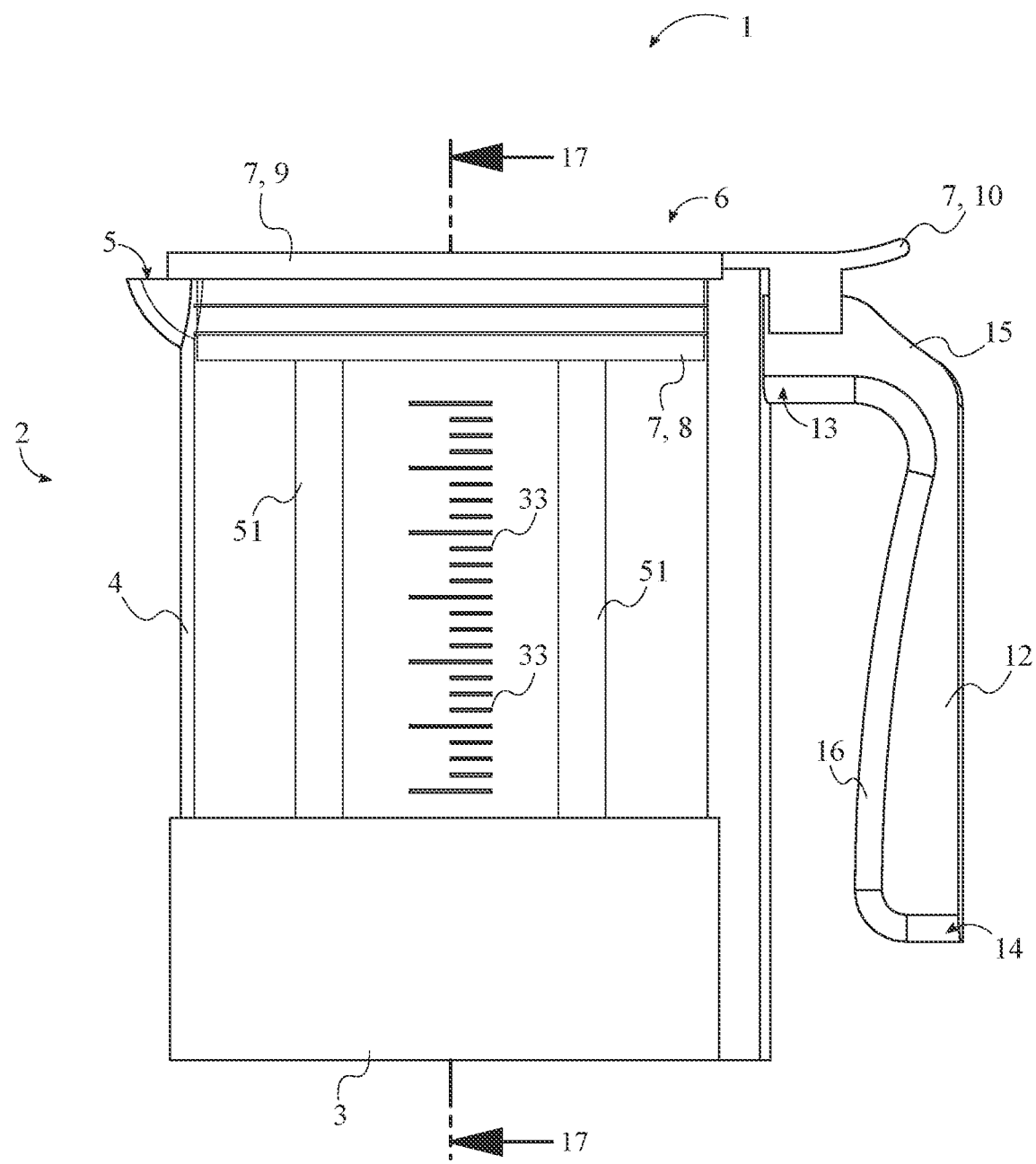
FIG. 16 is a front view of the infusion chamber of the present invention, wherein the infusion chamber is shown with the blade reduction screen.
Figure 17:
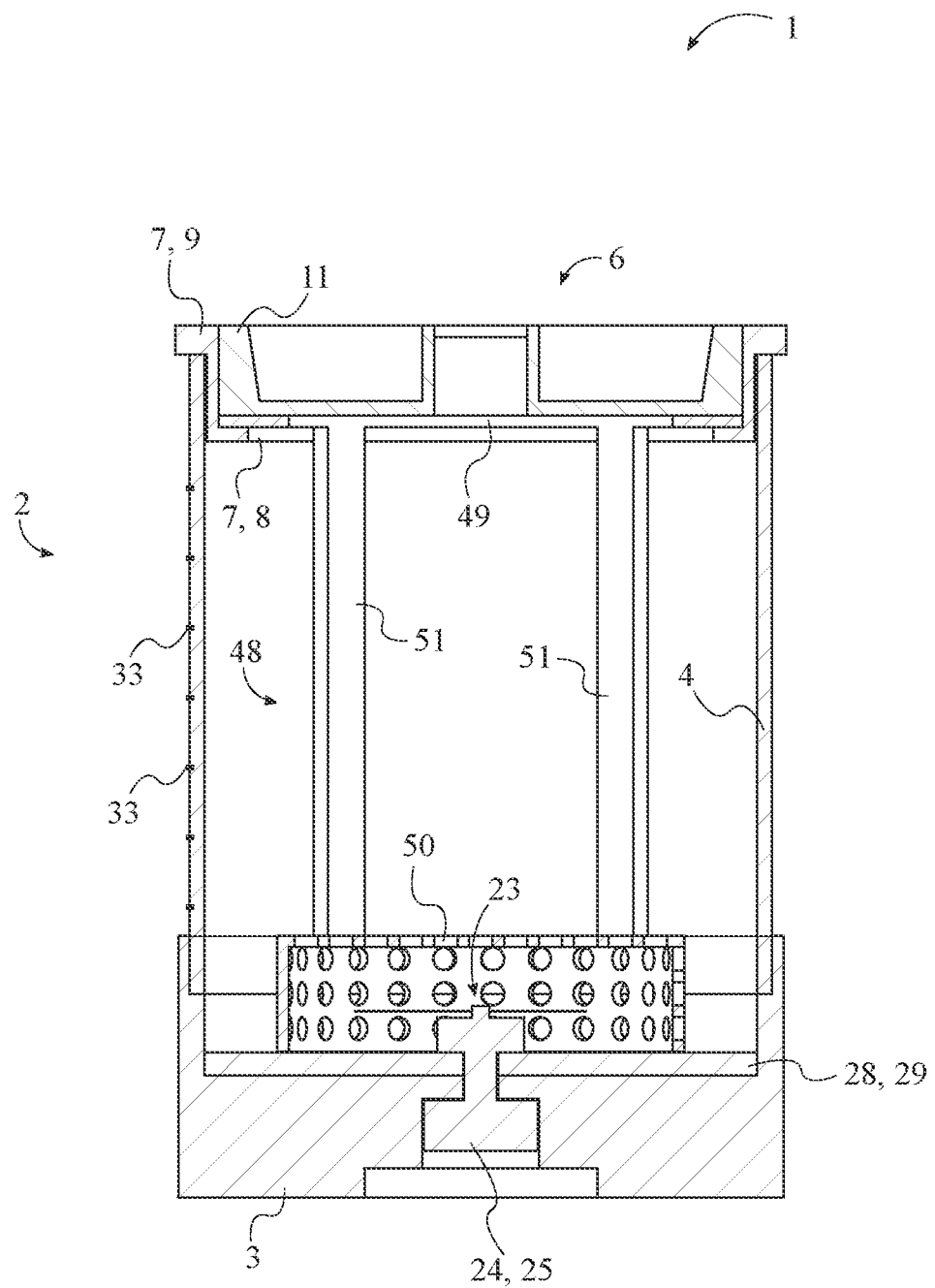
FIG. 17 is a vertical cross-sectional view taken in the direction of line 17-17 in FIG. 16.

In another embodiment, the present invention may further comprise a blade reduction screen 48. As can be seen in FIGS. 15 through 17, the blade reduction screen 48 enables the infusion process of different materials without the blending of solid infusion materials. For example, the blade reduction screen 48 prevents the blending of herbs while enabling oils or other liquids to be circulated throughout the entire chamber due to the centripetal acceleration of the at least one blade 27. To do so, the blade reduction screen 48 comprises a ring mount 49, a blade screen 50, and a plurality of screen rods 51. The ring mount 49 enables the attachment of the blade reduction screen 48 to the cover holder 7. The plurality of screen rods 51 positions the blade screen 50 around the blade assembly 23 to reduce solid materials from being blended. The blade screen 50 can be made from perforated materials such as mesh materials. Further, the blade screen 50 can be provided with different mesh hole sizes to accommodate different herbal to oil ratios. For example, the blade screen 50 can include mesh holes with size of one millimeter (mm) to produce extremely clean infusions. On the other hand, a blade screen 50 with mesh holes of size 10 mm can make infusions that are greener.

Accordingly, the plurality of screen rods 51 is radially distributed about the blade screen 50 to evenly position the blade screen 50 around the blade assembly 23. The ring mount 49 is similarly positioned around the blade screen 50 to ensure that the blade screen 50 is positioned around the blade assembly 23. Further, the blade screen 50 is terminally connected to each of the plurality of screen rods 51 to secure the blade screen 50 to the plurality of screen rods 51. Similarly, the ring mount 49 is terminally connected to each of the plurality of screen rods 51, opposite to the blade screen 50, to secure the ring mount 49 to the plurality of screen rods 51. Furthermore, the ring mount 49 is attached into the holder flange 9 to secure the blade reduction screen 48 to the cover holder 7. This way, when the user closed the chamber opening 5 with the cover holder 7, the blade screen 50 is positioned around the blade assembly 23 and securely kept in position during the infusion process. Together with the blade assembly 23, the blade reduction screen 48 enables the present invention to make infusions that are clean. When the blade reduction screen 48 is used, the blade reduction screen 48 blocks the herbal materials from touching the at least one blade 27. Thus, the user can make thick blends with heavy textures by just using the at least one blade 27 or remove the heavy taste and green texture of the infused products by utilizing blade reduction screen 48 during the infusion process.

Although the invention has been explained in relation to its preferred embodiment, it is to be understood that many other possible modifications and variations can be made without departing from the spirit and scope of the invention.

What is claimed is:

1. An herbal infusion and decarboxylation device comprising:
    an infusion chamber;
    an infusion mechanism;
    a controller;
    a power source;
    the infusion chamber comprising a chamber body, a lid assembly, and chamber handle;
    the infusion mechanism comprising a housing, a motor, a blade assembly, at least one heating plate, and at least one temperature sensor;
    the housing comprising a first housing base, a second housing base, and a housing lateral wall;
    the chamber body being mounted onto the housing;
    the lid assembly being mounted onto the chamber body, opposite to the housing;
    the chamber handle being laterally mounted to the chamber body in between the housing and the lid assembly;
    the motor and the controller being mounted within the housing;
    the blade assembly, the at least one heating plate, and the at least one temperature sensor being mounted within the chamber body, adjacent to the housing;
    the motor being operatively coupled to the blade assembly, wherein the motor is used to rotationally drive the blade assembly;
    the motor, the at least one heating plate, and the at least one temperature sensor being electronically connected to the controller;
    the motor and the at least one heating plate being electrically connected to the power source;
    the at least one temperature sensor being in thermal communication with the chamber body;
    the first housing base being positioned opposite to the second housing base about the housing lateral wall; and
    the chamber body being centrally mounted onto the first housing base.

2. The herbal infusion and decarboxylation device as claimed in claim 1 comprising:
    the chamber body comprising a chamber base, a chamber lateral wall, and a chamber opening;
    the chamber base being positioned opposite to the chamber opening about the chamber lateral wall;
    the chamber base being positioned coextensive with the housing;
    the chamber base being mounted onto the housing;
    the lid assembly being mounted across the chamber opening; and
    the chamber handle being mounted onto the chamber lateral wall.

3. The herbal infusion and decarboxylation device as claimed in claim 2 comprising:
    the blade assembly comprising a blade hub and at least one blade;
    the blade hub comprising a first hub end and a second hub end;
    the blade hub centrally traversing through the chamber base and the at least one heating plate;
    the first hub end being rotatably connected to the chamber base;
    the second hub end being rotatably connected to the at least one heating plate;
    the motor being operatively coupled to the first hub end, wherein the motor is used to rotationally drive the first hub end; and
    the at least one blade being torsionally connected to the second hub end.

4. The herbal infusion and decarboxylation device as claimed in claim 3, wherein the at least one blade is a low emulsion pitched blade.

5. The herbal infusion and decarboxylation device as claimed in claim 2 comprising:
    a plurality of markings;
    the plurality of markings being distributed along the chamber lateral wall; and
    the plurality of markings being inscribed onto the chamber lateral wall.

6. The herbal infusion and decarboxylation device as claimed in claim 2, wherein the chamber body is made of a transparent material.

7. The herbal infusion and decarboxylation device as claimed in claim 2 comprising:
    the at least one heating plate comprising an annular plate body;
    the annular plate body being positioned coextensive with the chamber base;
    the annular plate body being mounted onto the chamber base; and
    the blade assembly being centrally positioned with the annular plate body.

8. The herbal infusion and decarboxylation device as claimed in claim 1 comprising:
    a pin connector;
    the pin connector comprising a pin plug and a pin socket;
    the pin plug being integrated into the chamber body, adjacent to the housing;
    the pin socket being integrated into the housing, adjacent to the pin plug;
    the at least one heating plate being electrically connected to the power source through the pin connector; and
    the at least one heating plate and the at least one temperature sensor being electronically connected to the controller through the pin connector.

9. The herbal infusion and decarboxylation device as claimed in claim 1 comprising:
    a user interface;
    the user interface being integrated into the housing lateral wall;
    the user interface being electronically connected to the controller; and the user interface being electrically connected to the power source.

10. The herbal infusion and decarboxylation device as claimed in claim 1 comprising:
a heat-on visual indicator;
the heat-on visual indicator being positioned around the housing lateral wall;
the heat-on visual indicator being positioned adjacent to the second housing base;
the heat-on visual indicator being integrated into the housing lateral wall;
the heat-on visual indicator being electronically connected to the controller; and
the heat-on visual indicator being electrically connected to the power source.

11. The herbal infusion and decarboxylation device as claimed in claim 1 comprising:
a plurality of legs;
the plurality of legs being distributed across the second housing base; and
the plurality of legs being mounted onto the second housing base, opposite the housing lateral wall.

12. The herbal infusion and decarboxylation device as claimed in claim 1 comprising:
the lid assembly comprising a cover holder and a removable cover;
the cover holder comprising a holder lip and a holder flange;
the chamber body comprising a chamber base, a chamber lateral wall, and a chamber opening;
the chamber base being positioned opposite to the chamber opening about the chamber lateral wall;
the holder flange, the holder lip, and the removable cover being centrally positioned with each other;
the holder lip being perpendicularly connected to the holder flange;
the holder lip being hermetically attached into the chamber opening; and
the removable cover being hermetically attached onto the holder flange.

13. The herbal infusion and decarboxylation device as claimed in claim 12 comprising:
the cover holder further comprising a thumb tab;
the chamber handle comprising a first handle end and a second handle end;
the first handle end being positioned adjacent to the chamber opening;
the first handle end being externally mounted onto the chamber lateral wall;
the second handle end being positioned adjacent to the chamber base;
the thumb tab being peripherally connected to the holder flange; and
the thumb tab being removably connected to the first handle end.

14. The herbal infusion and decarboxylation device as claimed in claim 13 comprising:
the chamber handle further comprising a thumb rest and an anti-slip feature;
the thumb rest being positioned adjacent to the first handle end;
the thumb rest being integrated into the chamber handle, opposite to the chamber lateral wall;
the anti-slip feature being positioned adjacent to the second handle end; and
the anti-slip feature being integrated into the chamber handle, adjacent to the chamber lateral wall.

15. The herbal infusion and decarboxylation device as claimed in claim 12 comprising:
a mesh strainer;
the mesh strainer comprising a mesh receptacle and a mesh ring;
the mesh ring comprising an inner ring edge and an outer ring edge;
the mesh ring being connected around a receptacle opening of the mesh receptacle;
the mesh receptacle being positioned into the chamber body; and
the mesh ring being attached onto the holder flange.

16. The herbal infusion and decarboxylation device as claimed in claim 12 comprising:
a cartridge receptacle;
an odor control cartridge;
the cartridge receptacle being attached into the holder flange;
the odor control cartridge being positioned within the cartridge receptacle; and
the removable cover being positioned across the cartridge receptacle.

17. The herbal infusion and decarboxylation device as claimed in claim 12 comprising:
a blade reduction screen;
the blade reduction screen comprising a ring mount, a blade screen, and a plurality of screen rods;
the plurality of screen rods being radially distributed about the blade screen;
the ring mount being positioned around the blade screen;
the blade screen being terminally connected to each of the plurality of screen rods;
the ring mount being terminally connected to each of the plurality of screen rods, opposite to the blade screen; and
the ring mount being attached into the holder flange.

* * * * *